United States Patent
Wang et al.

(10) Patent No.: US 10,304,475 B1
(45) Date of Patent: May 28, 2019

(54) TRIGGER WORD BASED BEAM SELECTION

(71) Applicant: Amazon Technologies, Inc., Seattle, WA (US)

(72) Inventors: Rui Wang, Sunnyvale, CA (US); Amit Singh Chhetri, Santa Clara, CA (US); Xiaoxue Li, San Jose, CA (US); Trausti Thor Kristjansson, San Jose, CA (US); Philip Ryan Hilmes, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/676,273

(22) Filed: Aug. 14, 2017

(51) Int. Cl.
| | |
|---|---|
| *G10L 15/00* | (2013.01) |
| *G10L 15/04* | (2013.01) |
| *G10L 15/16* | (2006.01) |
| *G10L 15/20* | (2006.01) |
| *G10L 21/00* | (2013.01) |
| *G10L 21/02* | (2013.01) |
| *G10L 25/00* | (2013.01) |
| *G06F 17/20* | (2006.01) |
| *G06F 17/30* | (2006.01) |
| *G06F 7/00* | (2006.01) |
| *G10L 21/0216* | (2013.01) |
| *G10L 15/22* | (2006.01) |
| *G10L 15/26* | (2006.01) |
| *G10L 15/08* | (2006.01) |

(52) U.S. Cl.
CPC .......... *G10L 21/0216* (2013.01); *G10L 15/16* (2013.01); *G10L 15/22* (2013.01); *G10L 15/26* (2013.01); *G10L 2015/088* (2013.01); *G10L 2015/223* (2013.01); *G10L 2021/02166* (2013.01)

(58) Field of Classification Search
CPC ......... G10L 15/16; G10L 15/22; G10L 15/08; G10L 15/30; G10L 15/265; H05K 999/99; G06F 17/20864
See application file for complete search history.

(56) References Cited

U.S. PATENT DOCUMENTS

| | | | | |
|---|---|---|---|---|
| 5,893,902 | A * | 4/1999 | Transue | G06Q 20/04 704/270 |
| 8,160,883 | B2 * | 4/2012 | Lecoeuche | H04M 1/72561 379/88.01 |
| 9,390,708 | B1 * | 7/2016 | Hoffmeister | G10L 15/02 |
| 9,734,822 | B1 * | 8/2017 | Sundaram | G10L 15/08 |
| 9,734,845 | B1 * | 8/2017 | Liu | G10L 25/78 |
| 9,866,308 | B1 * | 1/2018 | Bultan | G01S 3/8006 |
| 9,940,949 | B1 * | 4/2018 | Vitaladevuni | G10L 25/78 |

(Continued)

*Primary Examiner* — Anne L Thomas-Homescu
(74) *Attorney, Agent, or Firm* — Pierce Atwood LLP

(57) ABSTRACT

An audio capture device that incorporates a beamformer and beam-specific trigger word detection. Audio data from each beam is processed by a low power trigger word detector, such as a neural network or other trained model to detect if audio data (such as an audio frame or feature vector corresponding thereto) likely includes part of a trigger word. The beam that either most strongly represents a trigger word portion or represents a trigger word portion most early in time may be selected for further processing such as speech processing or confirmation by a more robust power intensive trigger word detector.

20 Claims, 17 Drawing Sheets

(56) References Cited

U.S. PATENT DOCUMENTS

| | | | |
|---|---|---|---|
| 2004/0143374 A1* | 7/2004 | Horst | B61C 17/12 701/19 |
| 2004/0215458 A1* | 10/2004 | Kobayashi | G10L 15/06 704/251 |
| 2007/0038444 A1* | 2/2007 | Buck | B60R 16/0373 704/235 |
| 2007/0288242 A1* | 12/2007 | Spengler | G10L 15/20 704/275 |
| 2008/0172230 A1* | 7/2008 | Hayakawa | G10L 17/14 704/249 |
| 2010/0103776 A1* | 4/2010 | Chan | G01S 11/14 367/119 |
| 2010/0150364 A1* | 6/2010 | Buck | G01S 3/807 381/66 |
| 2011/0040561 A1* | 2/2011 | Vair | G10L 17/04 704/240 |
| 2012/0162471 A1* | 6/2012 | Sekiya | G10L 21/0208 348/231.4 |
| 2014/0324879 A1* | 10/2014 | Trease | G06F 16/951 707/741 |
| 2015/0046157 A1* | 2/2015 | Wolff | G10L 15/22 704/231 |
| 2015/0106085 A1* | 4/2015 | Lindahl | G10L 15/32 704/231 |
| 2015/0138333 A1* | 5/2015 | DeVaul | G06F 3/013 348/78 |
| 2015/0154002 A1* | 6/2015 | Weinstein | G06F 3/167 715/728 |
| 2015/0340032 A1* | 11/2015 | Gruenstein | G10L 15/16 704/232 |
| 2016/0077574 A1* | 3/2016 | Bansal | G06F 1/3215 704/275 |
| 2016/0077792 A1* | 3/2016 | Bansal | G06F 3/167 704/275 |
| 2016/0188619 A1* | 6/2016 | Su | G06F 16/3322 707/728 |
| 2017/0076720 A1* | 3/2017 | Gopalan | G06F 3/167 |
| 2017/0092262 A1* | 3/2017 | Pinhasi | G10L 15/02 |
| 2017/0148444 A1* | 5/2017 | Bocklet | G10L 17/22 |
| 2017/0213552 A1* | 7/2017 | Gupta | G10L 15/22 |
| 2017/0256255 A1* | 9/2017 | Booklet | G10L 15/10 |
| 2017/0256270 A1* | 9/2017 | Singaraju | G10L 25/84 |
| 2017/0301341 A1* | 10/2017 | Tyagi | G10L 15/14 |
| 2017/0351487 A1* | 12/2017 | Aviles-Casco Vaquero | G10L 17/00 |
| 2017/0358306 A1* | 12/2017 | Xue | G10L 15/07 |
| 2018/0005633 A1* | 1/2018 | Booklet | G10L 17/04 |
| 2018/0025727 A1* | 1/2018 | Kume | G10L 15/22 704/275 |
| 2018/0033428 A1* | 2/2018 | Kim | G10L 15/08 |
| 2018/0061396 A1* | 3/2018 | Srinivasan | G06F 17/3074 |
| 2018/0061404 A1* | 3/2018 | Devaraj | G10L 15/22 |
| 2018/0146306 A1* | 5/2018 | Benattar | H04R 25/407 |
| 2018/0173234 A1* | 6/2018 | Van Laack | G06K 9/00362 |
| 2018/0190282 A1* | 7/2018 | Mohammad | G10K 11/178 |
| 2018/0249246 A1* | 8/2018 | Kjems | G10L 21/0216 |
| 2018/0275956 A1* | 9/2018 | Reed | H04R 25/554 |
| 2018/0286433 A1* | 10/2018 | Hicks | G10L 25/84 |
| 2018/0332389 A1* | 11/2018 | Ekkizogloy | H04R 1/406 |
| 2018/0366117 A1* | 12/2018 | Carreras | G10L 15/22 |
| 2019/0028759 A1* | 1/2019 | Yuan | G10L 17/22 |

* cited by examiner

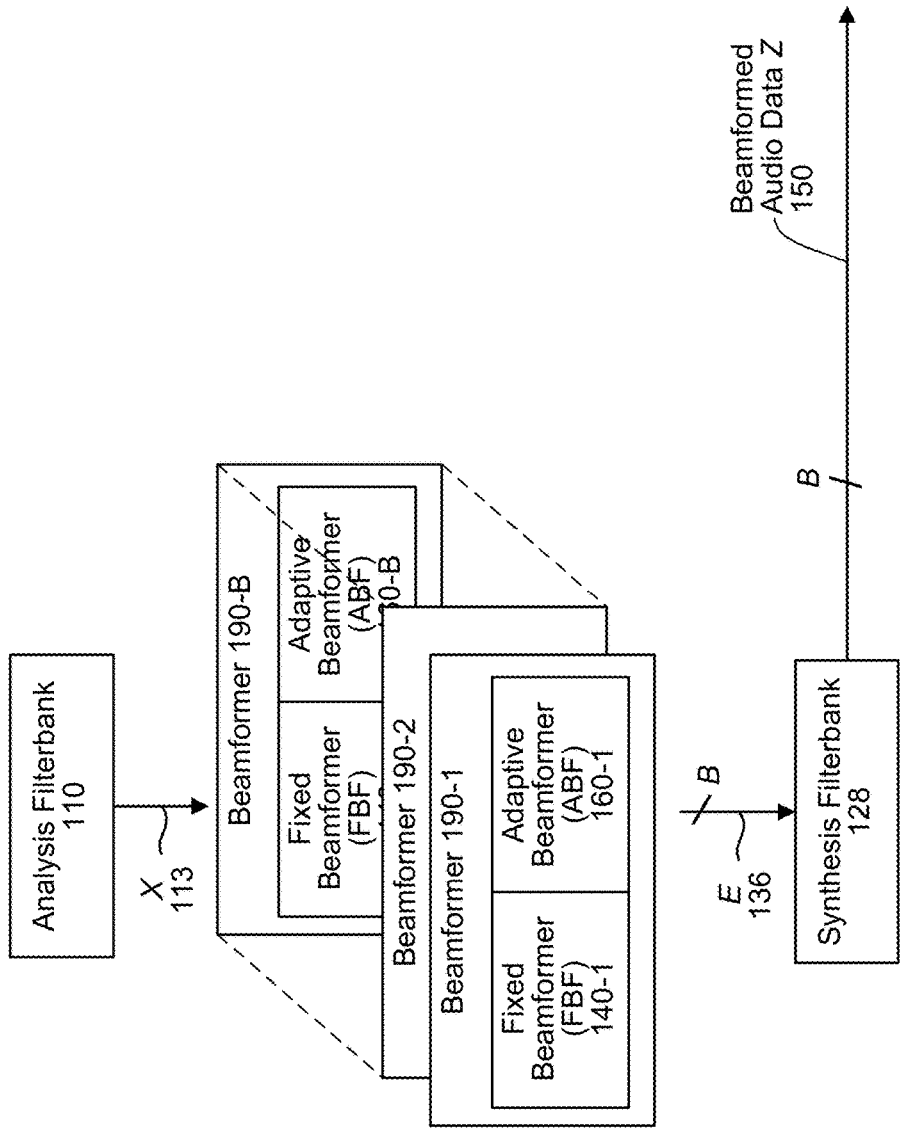

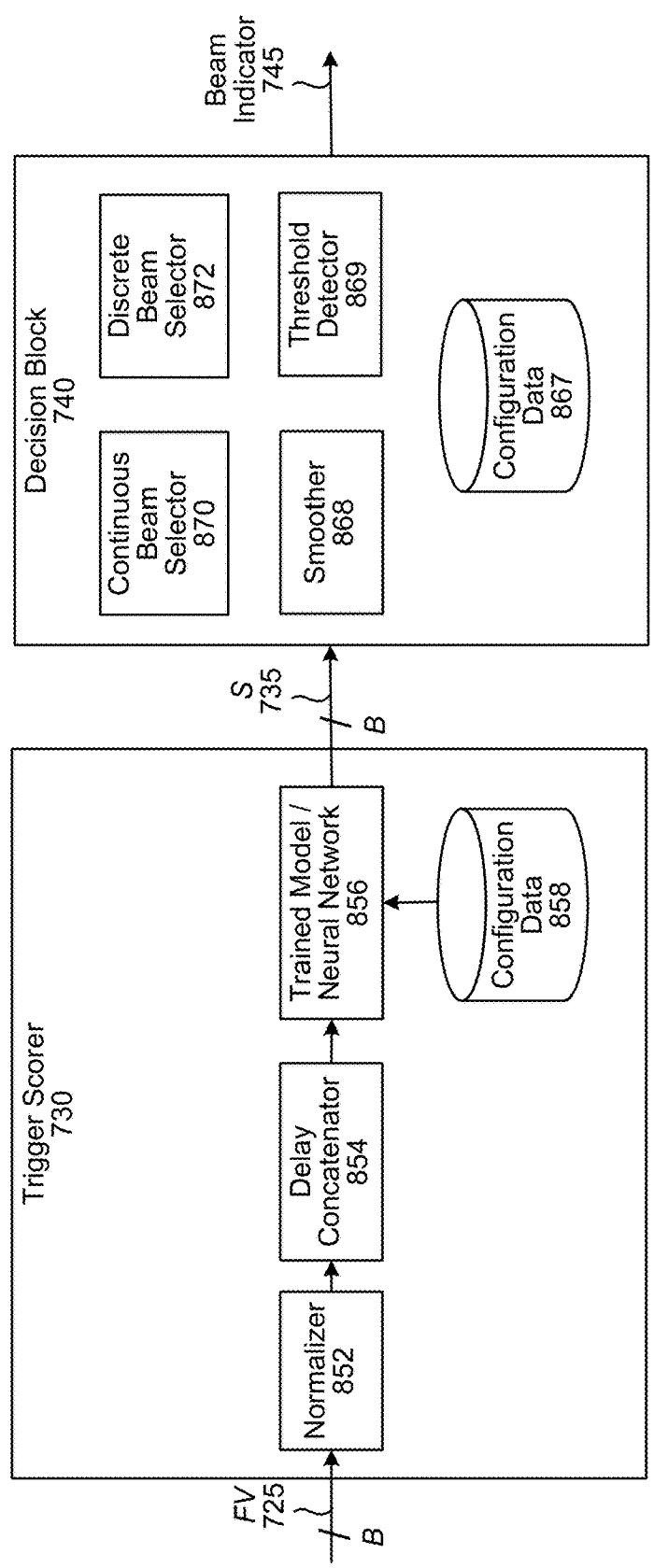

US 10,304,475 B1

TRIGGER WORD BASED BEAM SELECTION

BACKGROUND

In audio systems, beamforming refers to techniques that are used to isolate audio from a particular direction. Beamforming may be particularly useful when filtering out noise from non-desired directions. Beamforming may be used for various tasks, including isolating voice commands to be executed by a speech-processing system.

Speech recognition systems have progressed to the point where humans can interact with computing devices using speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices, such as those with beamforming capability, to improve human-computer interactions.

BRIEF DESCRIPTION OF DRAWINGS

For a more complete understanding of the present disclosure, reference is now made to the following description taken in conjunction with the accompanying drawings.

FIG. 6 illustrates a multiple FBF/ABF beamformer configuration for each beam according to embodiments of the present disclosure.

FIG. 8 is a block diagram of a trigger scorer and decision block according to embodiments of the present disclosure.

DETAILED DESCRIPTION

Figure 1:
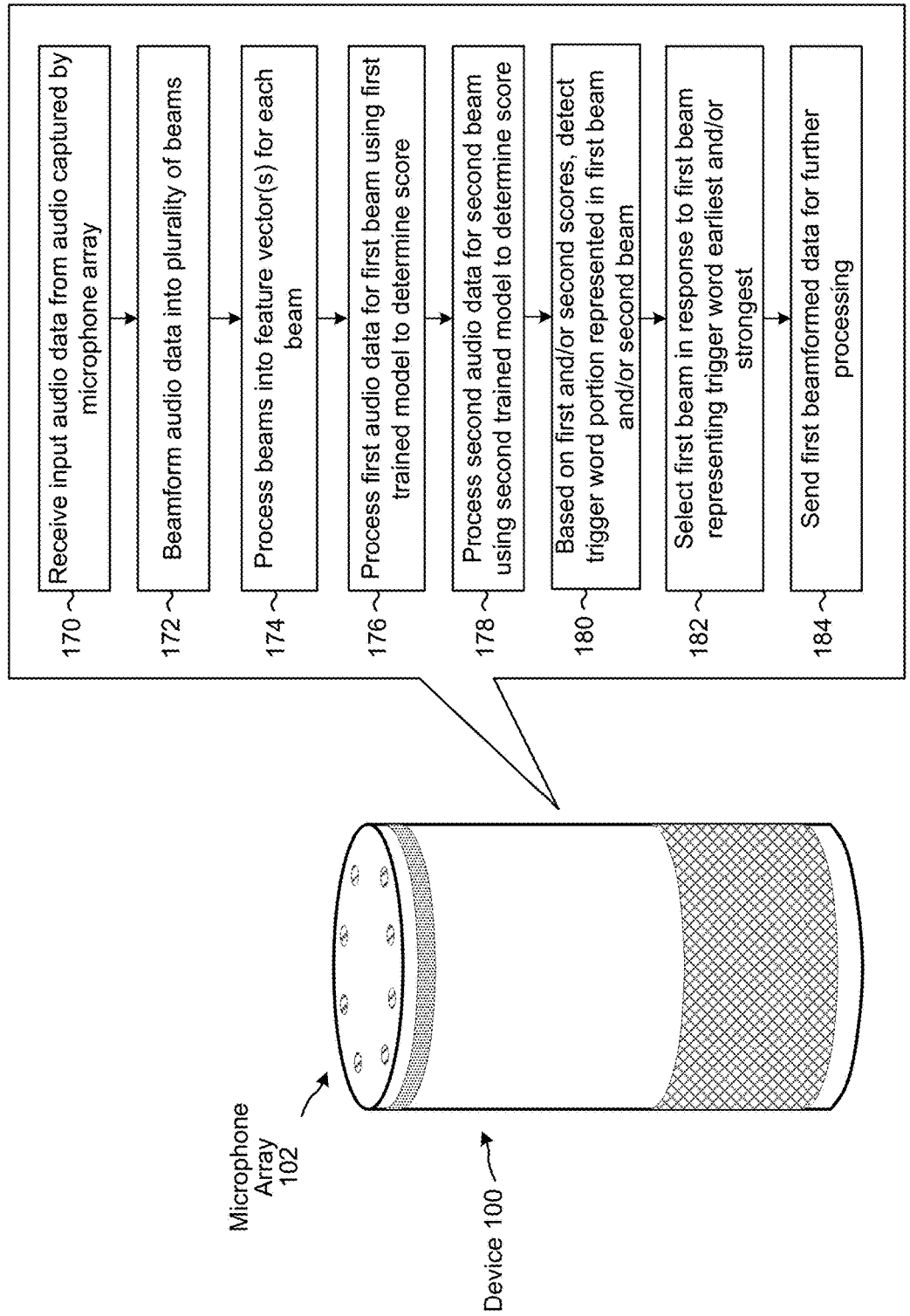
FIG. 1 illustrates a method for performing trigger word-based beam selection according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU within a reasonable time frame. Because of this, a distributed computing environment may be used when performing speech processing. A typical distributed environment may involve a local device having one or more microphones configured to capture sounds from a user speaking and convert those sounds into an audio signal. The audio signal/data may then be sent to a downstream remote device for further processing, such as converting the audio signal into an ultimate command. The command may then be executed by a combination of remote and local devices depending on the command itself.

As part of a distributed speech processing system, a local device may be configured to continuously send all detected input audio to a remote device. There are several drawbacks to such an approach. One drawback is that such communications would require significant bandwidth and networking resources. Another drawback to such an approach is that privacy concerns may make it undesirable for a local device to send all captured audio to a remote device. A still further drawback is that a remote device may waste significant computing resources processing all incoming audio when no commands are being issued in the majority of the audio.

To account for these problems, a local device may be configured to only activate upon a user speaking a particular waking command to wake the local device so the user may speak a further command. The waking command (which may be referred to as a wakeword), may include an indication for the system to perform further processing. The local device may continually listen for the wakeword and may disregard any audio detected that does not include the wakeword. Typically, systems are configured to detect a wakeword, and then process any subsequent audio following the wakeword (plus perhaps a fixed, but short amount of audio pre-wakeword) to detect any commands in the subsequent audio. As an example, a wakeword may include a name by which a user refers to a device. Thus, if the device was named "Alexa," and the wakeword was "Alexa," a user may command a voice controlled device to play music by saying "Alexa, play some music." The device, recognizing the wakeword "Alexa" would understand the subsequent audio (in this example, "play some music") to include a command of some sort and would send audio data corresponding to that subsequent audio (as well as potentially to the wakeword and some buffered audio prior to the wakeword) to a remote device (or maintain it locally) to perform speech processing on that audio to determine what the command is for execution. Provided services/commands may include performing actions or activities, rendering media, obtaining and/or providing information, providing information via generated or synthesized speech via a local device, initiating Internet-based services on behalf of the user, and so forth.

A wakeword is an example of a specialized keyword (also known as a trigger word). For a wakeword, the associated function is typically to "wake" a local device so that it may capture audio following (or surrounding) the wakeword and send audio data to a remote server for speech processing. For speech processing enabled systems, the wakeword may be the only trigger word recognized by the system and all other words are processed using typical speech processing. In systems where other trigger words may be enabled, each respective trigger word may only be associated with a single same function that is executed regardless of the operating context of the device. For example, saying "Alexa" (a wakeword) may activate speech processing components regardless of whatever else the system is doing. In another example "shutdown" may be a configured trigger word to shut off the system, also regardless of whatever else the system is doing.

Certain devices capable of capturing speech for speech processing may operate using a microphone array comprising multiple microphones, where beamforming techniques may be used to isolate desired audio including speech. Beamforming systems isolate audio from a particular direction in a multi-directional audio capture system. One technique for beamforming involves boosting audio received from a desired direction while dampening audio received from a non-desired direction.

In one example of a beamformer system, a fixed beamformer employs a filter-and-sum structure to boost an audio signal that originates from the desired direction (sometimes referred to as the look-direction) while largely attenuating audio signals that original from other directions. A fixed beamformer may effectively eliminate certain diffuse noise (e.g., undesirable audio), which is detectable in similar energies from various directions, but may be less effective in eliminating noise emanating from a single source in a particular non-desired direction. The beamformer may also incorporate an adaptive beamformer/noise canceller that can adaptively cancel noise from different directions depending on audio conditions.

As specific components of a device/speech processing system may only be configured to operate on a single stream of audio data, for systems that incorporate a beamformer, a device may first select the audio data corresponding to a specific beam and then send that selected audio data to forward on to downstream components for wakeword detection and/or speech processing.

One drawback to this approach is that a beam selection component may operate using techniques that are focused on audio data quality rather than necessarily the content of the audio data. For example, a beam selection component may process audio data corresponding to multiple beams and may analyze various data points of those beams such as signal-to-noise ratio (SNR), energy, degree of persistence, and/or other signal quality metrics. Such features, however, may not always prove adequate and may break down under noisy conditions. A poorly selected beam may reduce the effectiveness of wakeword detection and speech processing performance.

To improve wakeword detection, and trigger word detection generally, offered is a device that can perform low power beam-based trigger word detection for initial beam selection, with potential trigger word confirmation by higher power downstream trigger word detection component. In the present device, an individual neural network or other trained model may process the output of each beam. Each such model operates independently and provides a confidence score corresponding to whether a portion (or the whole) of a trigger word is detected in the particular beam. The beam that indicates a strongest presence or earliest presence of the trigger word according to the trained models may be selected for further processing. The beam may be used until a user command is over or a desired beam may be switched during speech capture depending on changes to the acoustic environment.

FIG. 1 illustrates a device 100 configured to capture audio, perform beamforming, and perform beam-level trigger word detection. As shown, the device 100 may include a microphone array 102 as well as other components, such as those discussed below. The device 100 may receive (170) input audio data corresponding to audio captured by the microphone array 102. The device may then beamform (172) the audio data into a plurality of beams. As used herein, the term beam may refer to particular audio data corresponding to the input audio data that was captured by the microphone array, where the particular audio data of a beam corresponds to a particular direction. Thus, each beam may include audio data corresponding to a particular direction relative to the device 100. So a beamforming component of the device (such as beamformer 190 discussed below) may divide input audio data from an array into different beams of audio data, each corresponding to a direction. The device 100 may process (174) each beam into one or more feature vector(s) corresponding to the beam. For example, one feature vector may correspond to a single audio frame for audio data of a particular beam. Typical audio frames may be 10 ms or 25 ms each. An audio frame for one beam may correspond to a same time period or a different time period as a different audio frame for another beam. The feature vectors determined may include values for features that may be considered by a trained model configured to detect a trigger word (or portion thereof) in audio data.

The device 100 may then process (176) first audio data for the first beam using a first trained model to determine a first score. The first audio data may be post-beamformed audio data (e.g., audio data for the first beam output by the beamformer) or may be one or more feature vectors for the first beam, such as those determined in step 174. The first score may correspond to a likelihood that a trigger word is represented in the first beam. The first score may be specific to a particular frame being considered by the first trained model, in which case the first score may correspond to a likelihood that a portion of the trigger word is represented in the frame under consideration, which in turn also corresponds to a likelihood that the trigger word is represented in the first beam.

The device 100 may also process (178) second audio data for the second beam using a second trained model to determine a second score. The second audio data may be post-beamformed audio data (e.g., audio data for the second beam output by the beamformer) or may be one or more feature vectors for the second beam, such as those determined in step 174. The second score may correspond to a likelihood that a trigger word is represented in the second beam. The second score may be specific to a particular frame being considered by the second trained model, in which case the second score may correspond to a likelihood that a portion of the trigger word is represented in the frame under consideration, which in turn also corresponds to a likelihood that the trigger word is represented in the second beam.

The first trained model and second trained model may have a similar configuration to each other and may be configured to operate on similar types of data (e.g., post-beamformed audio data, feature vectors, etc.). The first trained model may operate on data corresponding to the first beam and the second trained model may operate on data corresponding to the second beam. Such operation may be overlapping in time. The device 100 may also operate multiple different trained models depending on the number of beams determined by the device's beamformer (discussed below). Each beam may have a corresponding trained model to determine whether a trigger word (and/or portion thereof) is represented in audio data corresponding to the respective beam.

Based on the first and/or second scores, the device 100 may detect (180) that the trigger word or portion thereof is represented in one or both of the first beam and/or second beam. The first beam may represent the trigger word/portion thereof more strongly than the second beam (the strength of which may correspond to the first score relative to the second score) or the first beam may represent the trigger word/portion thereof earlier in time than the second beam (e.g., the trigger word may have come from the direction associated with the first beam rather than the direction associated with the second beam). The device may then select (182) the first beam in response to the first beam representing the trigger word earlier and/or representing the trigger word more strongly than the second beam.

The device may then send (184) audio data corresponding to the first beam (which may include post-beamformed data and/or other data such as feature vector(s)) to a downstream component for further processing. Such a downstream component may include, for example, a further trigger word/wakeword detection component, a speech processing component (which may be remote from the device 100), a further audio data processing component, some combination thereof, or some other downstream component.

Further details of the device operation are described below following a discussion of directionality in reference to FIGS. 2-3C.

Figure 2:
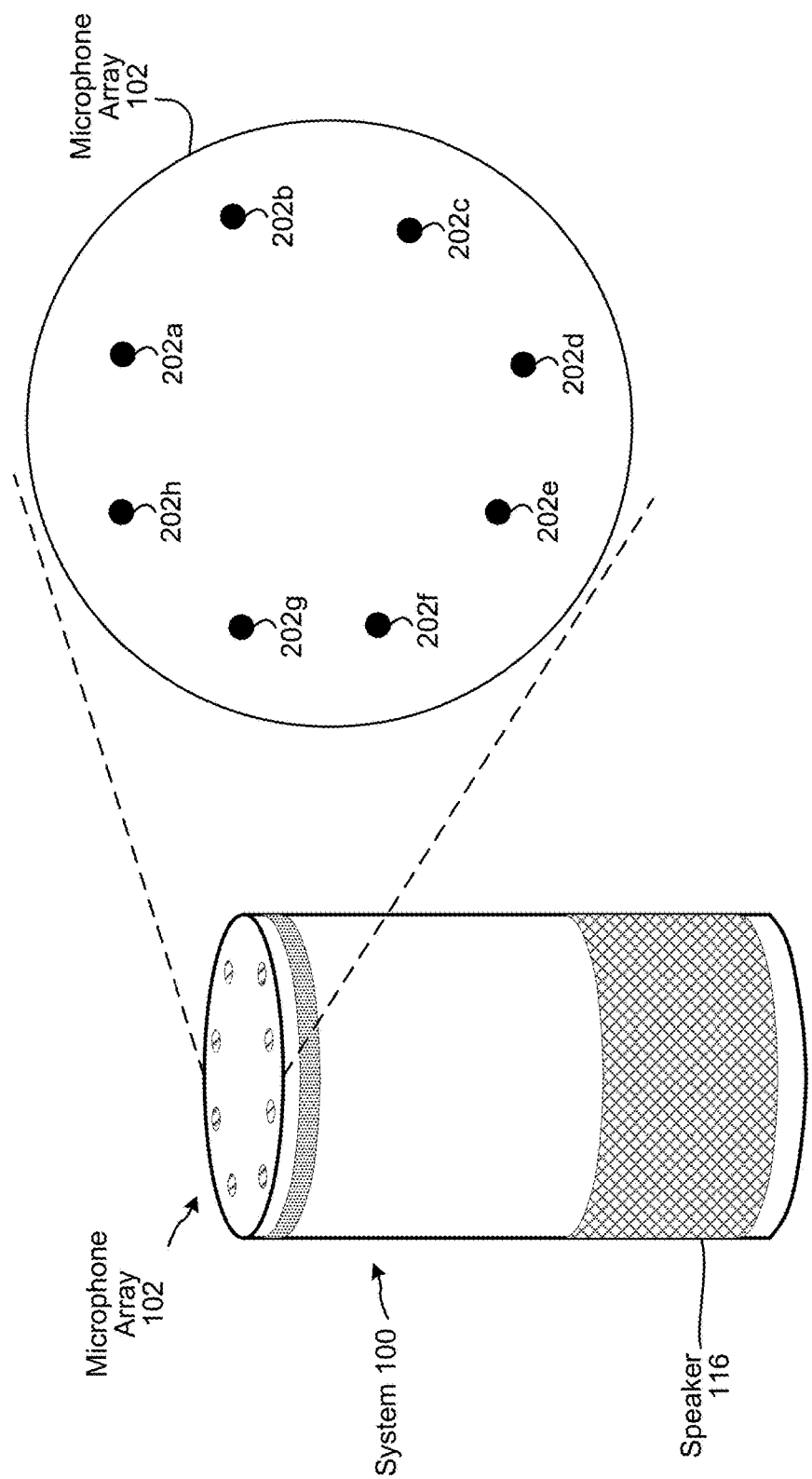
FIG. 2 illustrates a microphone array according to embodiments of the present disclosure.

As illustrated in FIG. 2, a device 100 may include, among other components, a microphone array 102, a speaker 116, a beamformer (as discussed below), or other components. The microphone array may include a number of different individual microphones. In the example configuration of FIG. 2, the array 102 includes eight (8) microphones, 202a-202h. The individual microphones may capture sound and pass the resulting audio signal created by the sound to a downstream component, such as an analysis filterbank discussed below. Each individual piece of audio data captured by a microphone may be in a time domain. To isolate audio from a particular direction, the device may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device may determine that the source of the audio that resulted in the segment of audio data may be located closer to the first microphone than to the second microphone (which resulted in the audio being detected by the first microphone before being detected by the second microphone).

Figure 3A:
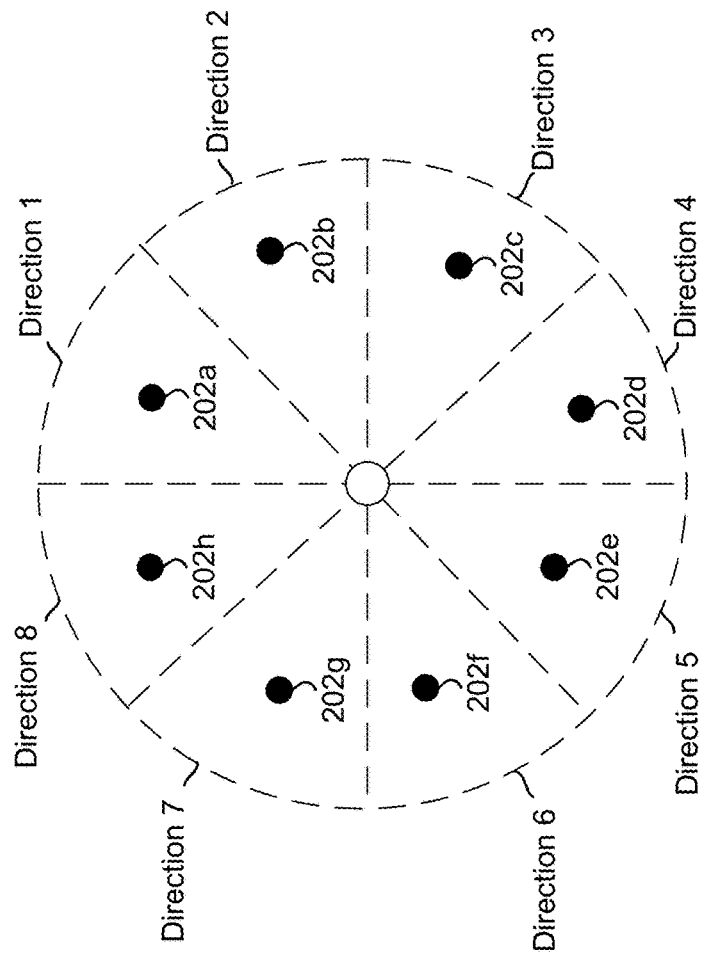
FIG. 3A illustrates associating directions with microphones of a microphone array according to embodiments of the present disclosure.
Figure 3B:
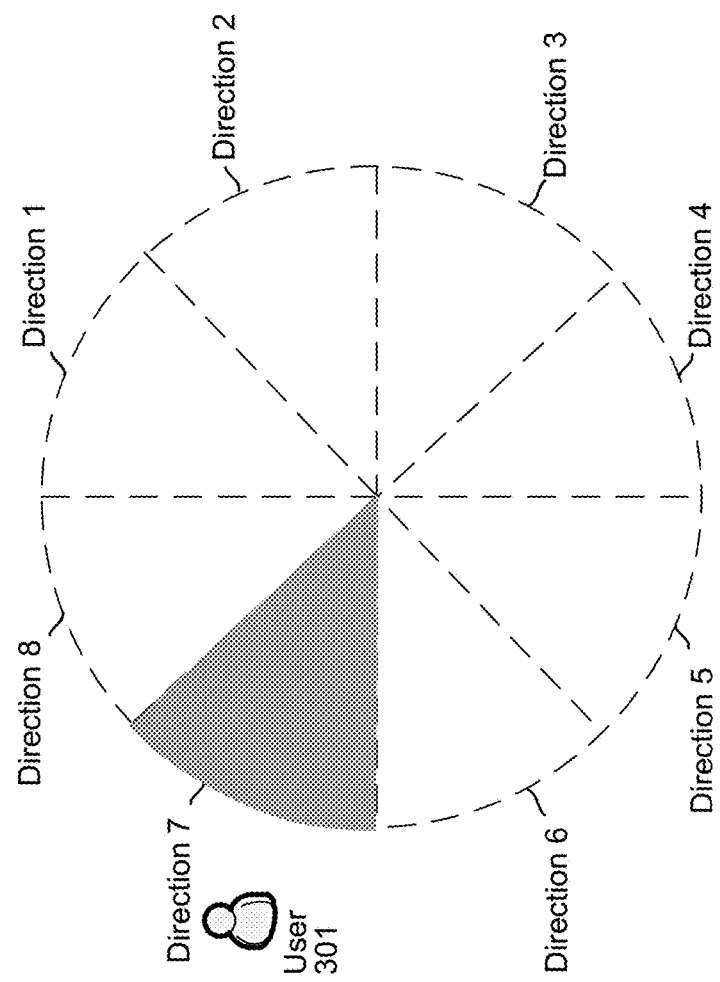
FIGS. 3B and 3C illustrate isolating audio from a direction to focus on a desired audio source according to embodiments of the present disclosure.
Figure 3C:
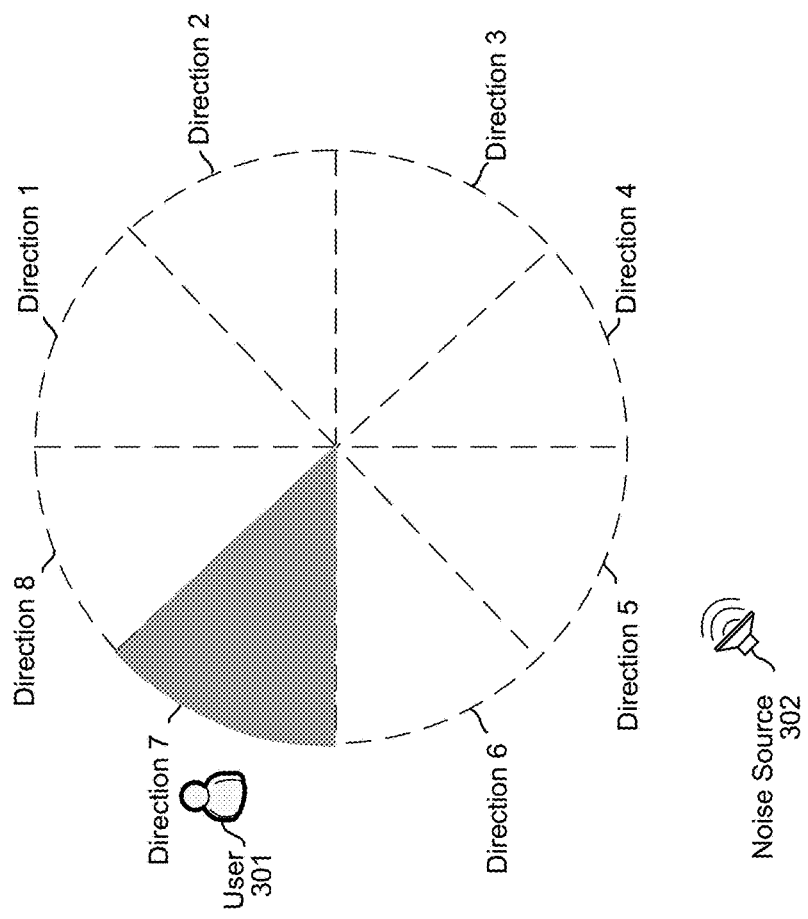

Using such direction isolation techniques, a device 100 may isolate directionality of audio sources. As shown in FIG. 3A, a particular direction may be associated with a particular microphone of a microphone array, where the azimuth angles for the plane of the microphone array may be divided into bins (e.g., 0-45 degrees, 46-90 degrees, and so forth) where each bin direction is associated with a microphone in the microphone array. For example, direction 1 is associated with microphone 202a, direction 2 is associated with microphone 202b, and so on. Alternatively, particular directions and/or beams may not necessarily be associated with a specific microphone.

To isolate audio from a particular direction the device may apply a variety of audio filters to the output of the microphones where certain audio is boosted while other audio is dampened, to create isolated audio corresponding to a particular direction, which may be referred to as a beam. While the number of beams may correspond to the number of microphones, this need not be the case. For example, a two-microphone array may be processed to obtain more than two beams, thus using filters and beamforming techniques to isolate audio from more than two directions. Thus, the number of microphones may be more than, less than, or the same as the number of beams. The beamformer of the device may have an adaptive beamformer (ABF)/fixed beamformer (FBF) processing pipeline for each beam, as explained below.

The device may use various techniques to determine the beam corresponding to the look-direction. If audio is detected first by a particular microphone the device 100 may determine that the source of the audio is associated with the direction of the microphone in the array. Other techniques may include determining what microphone detected the audio with a largest amplitude (which in turn may result in a highest strength of the audio signal portion corresponding to the audio). Other techniques (either in the time domain or in the sub-band domain) may also be used such as calculating a signal-to-noise ratio (SNR) for each beam, performing voice activity detection (VAD) on each beam, or the like.

For example, if audio data corresponding to a user's speech is first detected and/or is most strongly detected by microphone 202g, the device may determine that the user is located in a location in direction 7. Using a FBF or other such component, the device may isolate audio coming from direction 7 using techniques known to the art and/or explained herein. Thus, as shown in FIG. 4B, the device 100 may boost audio coming from direction 7, thus increasing the amplitude of audio data corresponding to speech from user 301 relative to other audio captured from other directions. In this manner, noise from diffuse sources that is coming from all the other directions will be dampened relative to the desired audio (e.g., speech from user 301) coming from direction 7.

One drawback to the FBF approach is that it may not function as well in dampening/cancelling noise from a noise source that is not diffuse, but rather coherent and focused from a particular direction. For example, as shown in FIG. 3C, a noise source 302 may be coming from direction 5 but may be sufficiently loud that noise cancelling/beamforming techniques using an FBF alone may not be sufficient to remove all the undesired audio coming from the noise source 302, thus resulting in an ultimate output audio signal determined by the device 100 that includes some representation of the desired audio resulting from user 301 but also some representation of the undesired audio resulting from noise source 302.

Figure 4:
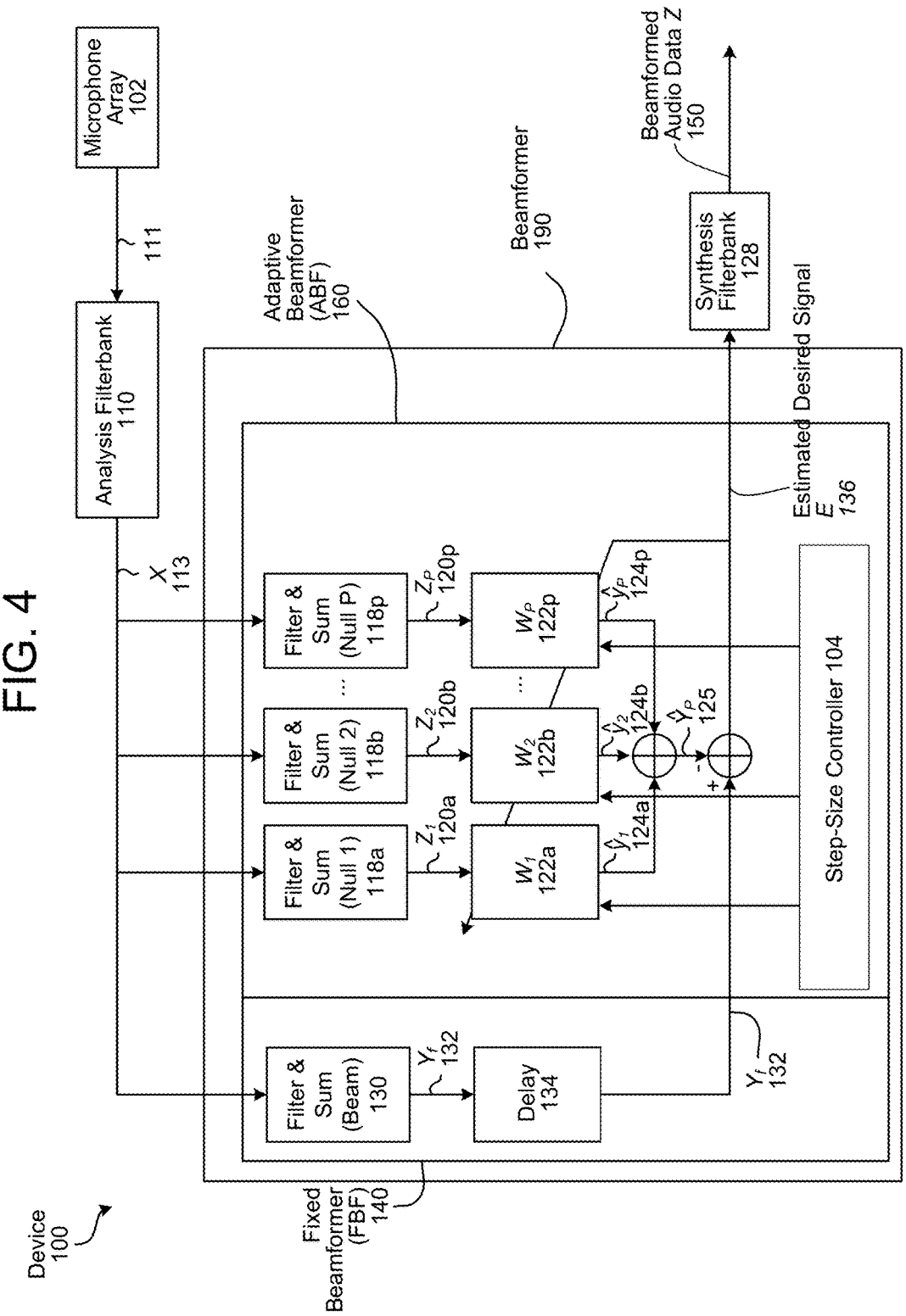
FIG. 4 illustrates a beamforming device that combines a fixed beamformer and an adaptive beamformer according to embodiments of the present disclosure.

FIG. 4 illustrates a high-level conceptual block diagram of a device 100 configured to performing beamforming using a fixed beamformer and an adaptive noise canceller that can remove noise from particular directions using adaptively controlled coefficients which can adjust how much noise is cancelled from particular directions. The FBF 140 may be a separate component or may be included in another component such as a general beamformer 190. As explained below, the FBF may operate a filter and sum component 130 to isolate the first audio signal from the direction of an audio source. The components of FIG. 4 may be used with the arrangement illustrated in FIG. 1A, even though the adjusting component 146 and other components are not illustrated or discussed with regard to FIG. 4.

The device 100 may also operate an adaptive beamformer component (ABF) 160 to amplify audio signals from directions other than the direction of an audio source. Those audio signals represent noise signals so the resulting amplified audio signals from the ABF may be referred to as noise reference signals 120, discussed further below. The device 100 may then weight the noise reference signals, for example using filters 122 discussed below. The device may combine the weighted noise reference signals 124 into a combined (weighted) noise reference signal 125. Alternatively the device may not weight the noise reference signals and may simply combine them into the combined noise reference signal 125 without weighting. The device may then subtract the combined noise reference signal 125 from the amplified first audio signal 132 to obtain a difference 136. The device may then output that difference, which represents the desired output audio signal with the noise removed. The diffuse noise is removed by the FBF when determining the signal 132 and the directional noise is removed when the combined noise reference signal 125 is subtracted. The device may also use the difference to create updated weights (for example for filters 122) to create updated weights that may be used to weight future audio signals. The step-size controller 104 may be used modulate the rate of adaptation from one weight to an updated weight.

In this manner noise reference signals are used to adaptively estimate the noise contained in the output of the FBF signal using the noise-estimation filters 122. This noise estimate is then subtracted from the FBF output signal to obtain the final ABF output signal. The ABF output signal is also used to adaptively update the coefficients of the noise-estimation filters. Lastly, we make use of a robust step-size controller to control the rate of adaptation of the noise estimation filters.

As shown in FIG. 4, input audio data 111 captured by a microphone array may be input into an analysis filterbank 110. The filterbank 110 may include a uniform discrete Fourier transform (DFT) filterbank which converts input audio data 111 in the time domain into an audio signal X 113 in the sub-band domain. The audio signal X may incorporate audio signals corresponding to multiple different microphones as well as different sub-bands (i.e., frequency ranges) as well as different frame indices (i.e., time ranges). Thus the audio signal from the mth microphone may be represented as $X_m(k,n)$, where k denotes the sub-band index and n denotes the frame index. The combination of all audio signals for all microphones for a particular sub-band index frame index may be represented as $X(k,n)$.

Figure 5:
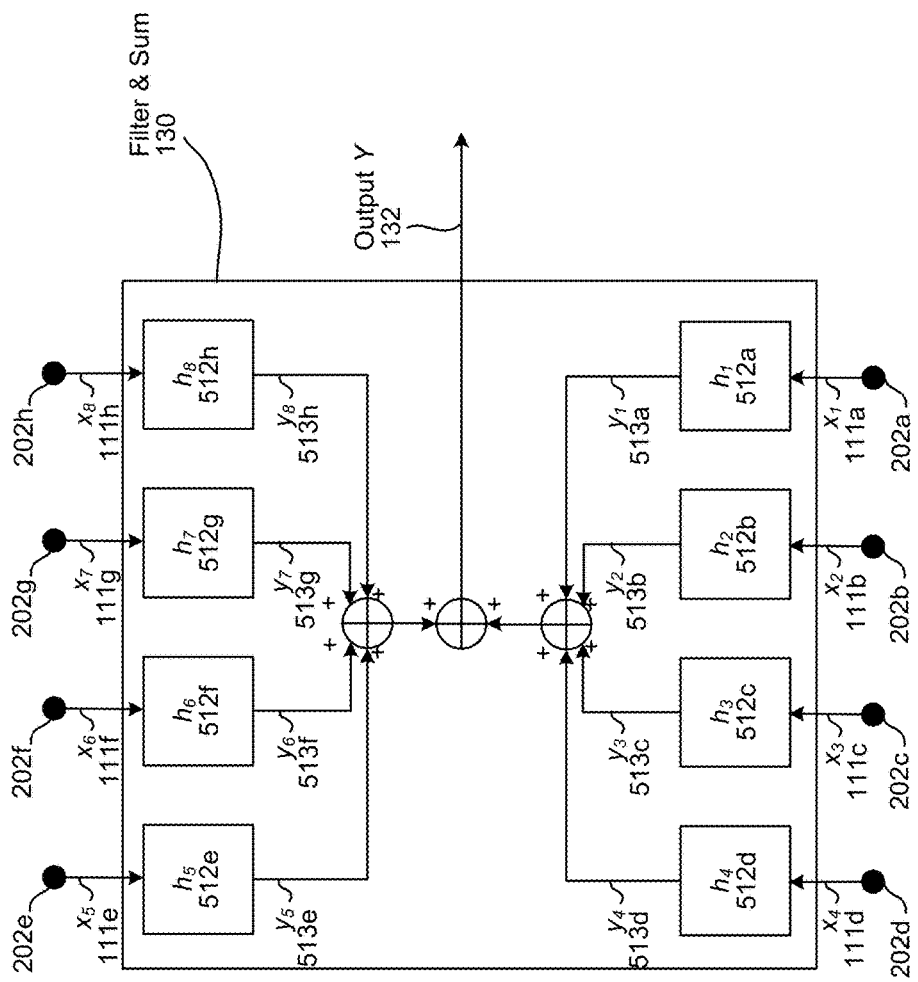
FIG. 5 illustrates a filter and sum component according to embodiments of the present disclosure.

The audio signal X 113 may be passed to the FBF 140 including the filter and sum unit 130. The FBF 140 may be implemented as a robust super-directive beamformer, delayed sum beamformer, or the like. The FBF 140 is presently illustrated as a super-directive beamformer (SDBF) due to its improved directivity properties. The filter and sum unit 130 takes the audio signals from each of the microphones and boosts the audio signal from the microphone associated with the desired look direction and attenuates signals arriving from other microphones/directions. The filter and sum unit 130 may operate as illustrated in FIG. 5. As shown in FIG. 5, the filter and sum unit 130 may be configured to match the number of microphones of the microphone array. For example, for a microphone array with eight microphones, the filter and sum unit may have eight filter blocks 512. The input audio signals $x_1$ 111a through $x_8$ 111h for each microphone are received by the filter and sum unit 130. The audio signals $x_1$ 111a through $x_8$ 111h correspond to individual microphones 202a through 202h, for example audio signal $x_1$ 111a corresponds to microphone 202a, audio signal $x_2$ 111b corresponds to microphone 202b and so forth. Although shown as originating at the microphones, the audio signals $x_1$ 111a through $x_8$ 111h may be in the sub-band domain and thus may actually be output by the analysis filterbank before arriving at the filter and sum component 130. Each filter block 512 is also associated with a particular microphone. Each filter block is configured to either boost (e.g., increase) or dampen (e.g., decrease) its respective incoming audio signal by the respective beamformer filter coefficient h depending on the configuration of the FBF. Each resulting filtered audio signal y 513 will be the audio signal x 111 weighted by the beamformer filter coefficient h of the filter block 512. For example, $y_1=x_1*h_1$, $y_2=x_2*h_2$, and so forth. The filter coefficients are configured for a particular FBF associated with a particular beam.

As illustrated in FIG. 6, the beamformer 190 configuration (including the FBF 140 and the ABF 160) illustrated in FIG. 4, may be implemented multiple times in a single device 100. The number of beamformer 190 blocks may correspond to the number of beams B. For example, if there are eight beams, there may be eight FBF components 140 and eight ABF components 160. Each beamformer 190 may operate as described in reference to FIG. 4, with an individual output E 136 for each beam created by the respective beamformer 190. Thus, B different outputs 136 may result. For device configuration purposes, there may also be B different other components, such as the synthesis filterbank 128, but that may depend on device configuration. Each individual beam pipeline may result in its own beamformed audio data Z 150, such that there may be B different beamformed audio data portions Z 150. Each beam's respective beamformed audio data Z 150 may be in a format corresponding to an input audio data 111 or in an alternate format. For example, the input audio data 111 and/or the beamformed audio data Z 150 may be sampled at a rate corresponding to 16 kHz and a mono-channel at 16 bits per sample, little endian format. Audio data in little endian format corresponds to storing the least significant byte of the audio data in the smallest address, as opposed to big endian format where the most significant byte of the audio data is stored in the smallest address.

Each particular FBF may be tuned with filter coefficients to boost audio from one of the particular beams. For example, FBF 140-1 may be tuned to boost audio from beam 1, FBF 140-2 may be tuned to boost audio from beam 2 and so forth. If the filter block is associated with the particular beam, its beamformer filter coefficient h will be high whereas if the filter block is associated with a different beam, its beamformer filter coefficient h will be lower. For example, for FBF 140-7 direction 7, the beamformer filter coefficient $h_7$ for filter 512g may be high while beamformer filter coefficients $h_1$-$h_6$ and $h_8$ may be lower. Thus the filtered audio signal $y_7$ will be comparatively stronger than the filtered audio signals $y_1$-$y_6$ and $y_8$ thus boosting audio from direction 7 relative to the other directions. The filtered audio signals will then be summed together to create the output audio signal The filtered audio signals will then be summed together to create the output audio signal $Y_f$ 132. Thus, the FBF 140 may phase align microphone data toward a given direction and add it up. So signals that are arriving from a particular direction are reinforced, but signals that are not arriving from the look direction are suppressed. The robust FBF coefficients are designed by solving a constrained convex optimization problem and by specifically taking into account the gain and phase mismatch on the microphones.

The individual beamformer filter coefficients may be represented as $H_{BF,m}(r)$, where r=0, . . . R, where R denotes the number of beamformer filter coefficients in the subband domain. Thus, the output $Y_f$ 132 of the filter and sum unit 130 may be represented as the summation of each microphone signal filtered by its beamformer coefficient and summed up across the M microphones:

$$Y(k, n) = \sum_{m=1}^{M} \sum_{r=0}^{R} H_{BF,m}(r) X_m(k, n - r) \qquad (7)$$

Turning once again to FIG. 4, the output $Y_f$ 132, expressed in Equation 7, may be fed into a delay component 134, which delays the forwarding of the output Y until further adaptive noise cancelling functions as described below may be performed. One drawback to output $Y_f$ 132, however, is that it may include residual directional noise that was not canceled by the FBF 140. To remove that directional noise, the device 100 may operate an adaptive beamformer 160 which includes components to obtain the remaining noise reference signal which may be used to remove the remaining noise from output Y.

As shown in FIG. 4, the adaptive noise canceller may include a number of nullformer blocks 118a through 118p. The device 100 may include P number of nullformer blocks 118 where P corresponds to the number of channels, where each channel corresponds to a direction in which the device may focus the nullformers 118 to isolate detected noise. The number of channels P is configurable and may be predetermined for a particular device 100. Each nullformer block is configured to operate similarly to the filter and sum block 130, only instead of the filter coefficients for the nullformer blocks being selected to boost the look ahead direction, they are selected to boost one of the other, non-look ahead directions. Thus, for example, nullformer 118a is configured to boost audio from direction 1, nullformer 118b is configured to boost audio from direction 2, and so forth. Thus, the nullformer may actually dampen the desired audio (e.g., speech) while boosting and isolating undesired audio (e.g., noise). For example, nullformer 118a may be configured (e.g., using a high filter coefficient $h_1$ 512a) to boost the signal from microphone 202a/direction 1, regardless of the look ahead direction. Nullformers 118b through 118p may operate in similar fashion relative to their respective microphones/directions, though the individual coefficients for a particular channel's nullformer in one beam pipeline may differ from the individual coefficients from a nullformer for the same channel in a different beam's pipeline. The output Z 120 of each nullformer 118 will be a boosted signal corresponding to a non-desired direction. As audio from non-desired direction may include noise, each signal Z 120 may be referred to as a noise reference signal. Thus, for each channel 1 through P the adaptive beamformer 160 calculates a noise reference signal Z 120, namely $Z_1$ 120a through $Z_P$ 120p. Thus, the noise reference signals that are acquired by spatially focusing towards the various noise sources in the environment and away from the desired look-direction. The noise reference signal for channel p may thus be represented as $Z_p(k, n)$ where $Z_p$ is calculated as follows:

$$Z_p(k, n) = \sum_{m=1}^{M} \sum_{r=0}^{R} H_{NF,m}(p, r) X_m(k, n - r) \qquad (8)$$

where $H_{NF,m}(p,r)$ represents the nullformer coefficients for reference channel p.

As described above, the coefficients for the nullformer filters 512 are designed to form a spatial null toward the look ahead direction while focusing on other directions, such as directions of dominant noise sources (e.g., noise source 302). The output from the individual nullformers $Z_1$ 120a through $Z_P$ 120p thus represent the noise from channels 1 through P.

The individual noise reference signals may then be filtered by noise estimation filter blocks 122 configured with weights W to adjust how much each individual channel's noise reference signal should be weighted in the eventual combined noise reference signal $\hat{Y}$ 125. The noise estimation filters (further discussed below) are selected to isolate the noise to be removed from output $Y_f$ 132. The individual channel's weighted noise reference signal $\hat{y}$ 124 is thus the channel's noise reference signal Z multiplied by the channel's weight W. For example, $\hat{y}_1 = Z_1 * W_1$, $\hat{y}_2 = Z_2 * W_2$, and so forth. Thus, the combined weighted noise estimate Y 125 may be represented as:

$$\hat{Y}_P(k, n) = \sum_{l=0}^{L} W_P(k, n, l) Z_P(k, n - l) \qquad (9)$$

where $W_p(k,n,l)$ is the lth element of $W_p(k,n)$ and l denotes the index for the filter coefficient in subband domain. The noise estimates of the P reference channels are then added to obtain the overall noise estimate:

$$\hat{Y}(k, n) = \sum_{p=1}^{P} \hat{Y}_p(k, n) \qquad (10)$$

The combined weighted noise reference signal $\hat{Y}$ 125, which represents the estimated noise in the audio signal, may then be subtracted from the FBF output $Y_f$ 132 to obtain a signal E 136, which represents the error between the combined weighted noise reference signal $\hat{Y}$ 125 and the FBF output $Y_f$ 132. That error, E 136, is thus the estimated desired non-noise portion (e.g., target signal portion) of the audio signal and may be the output of the adaptive beamformer 160. That error, E 136, may be represented as:

$$E(k,n) = Y(k,n) - \hat{Y}(k,n) \qquad (11)$$

As shown in FIG. 4, the ABF output signal 136 may also be used to update the weights W of the noise estimation filter blocks 122 using sub-band adaptive filters, such as with a normalized least mean square (NLMS) approach:

$$W_p(k, n) = W_p(k, n-1) + \frac{\mu_p(k, n)}{\|Z_p(k, n)\|^2 + \varepsilon} Z_p(k, n) E(k, n) \quad (12)$$

where $Z_p(k,n) = [Z_p(k,n)\ Z_p(k,n-1) \ldots Z_p(k,n-L)]^T$ is the noise estimation vector for the pth channel, $\mu_p(k,n)$ is the adaptation step-size for the pth channel, and $\varepsilon$ is a regularization factor to avoid indeterministic division. The weights may correspond to how much noise is coming from a particular direction.

As can be seen in Equation 12, the updating of the weights W involves feedback. The weights W are recursively updated by the weight correction term (the second half of the right hand side of Equation 12) which depends on the adaptation step size, $\mu_p(k,n)$, which is a weighting factor adjustment to be added to the previous weighting factor for the filter to obtain the next weighting factor for the filter (to be applied to the next incoming signal). To ensure that the weights are updated robustly (to avoid, for example, target signal cancellation) the step size $\mu_p(k,n)$ may be modulated according to signal conditions. For example, when the desired signal arrives from the look-direction, the step-size is significantly reduced, thereby slowing down the adaptation process and avoiding unnecessary changes of the weights W. Likewise, when there is no signal activity in the look-direction, the step-size may be increased to achieve a larger value so that weight adaptation continues normally. The step-size may be greater than 0, and may be limited to a maximum value. Thus, the device may be configured to determine when there is an active source (e.g., a speaking user) in the look-direction. The device may perform this determination with a frequency that depends on the adaptation step size.

The step-size controller 104 will modulate the rate of adaptation. Although not shown in FIG. 4, the step-size controller 104 may receive various inputs to control the step size and rate of adaptation including the noise reference signals 120, the FBF output $Y_f$ 132, the previous step size, the nominal step size (described below) and other data. The step-size controller may calculate Equations 6-12 below. In particular, the step-size controller 104 may compute the adaptation step-size for each channel p, sub-band k, and frame n. To make the measurement of whether there is an active source in the look-direction, the device may measure a ratio of the energy content of the beam in the look direction (e.g., the look direction signal in output $Y_f$ 132) to the ratio of the energy content of the beams in the non-look directions (e.g., the non-look direction signals of noise reference signals $Z_1$ 120a through $Z_P$ 120p). This may be referred to as a beam-to-null ratio (BNR). For each subband, the device may measure the BNR. If the BNR is large, then an active source may be found in the look direction, if not, an active source may not be in the look direction.

The BNR may be computed as:

$$BNR_p(k, n) = \frac{B_{YY}(k, n)}{N_{ZZ,p}(k, n) + \delta'}, k \in [k_{LB}, k_{UB}] \quad \text{(Equation 13)}$$

where, $k_{LB}$ denotes the lower bound for the subband range bin and $k_{UB}$ denotes the upper bound for the subband range bin under consideration, and $\delta$ is a regularization factor. Further, $B_{YY}(k,n)$ denotes the powers of the fixed beamformer output signal (e.g., output $Y_f$ 132) and $N_{ZZ,p}(k,n)$ denotes the powers of the pth nullformer output signals (e.g., the noise reference signals $Z_1$ 120a through $Z_P$ 120p). The powers may be calculated using first order recursive averaging as shown below:

$$B_{YY}(k,n) = \alpha B_{YY}(k,n-1) + (1-\alpha)|Y(k,n)|^2$$

$$N_{ZZ,p}(k,n) = \alpha N_{ZZ,p}(k,n-1) + (1-\alpha)|Z_p(k,n)|^2 \quad (14)$$

where, $\alpha \in [0,1]$ is a smoothing parameter.

The BNR values may be limited to a minimum and maximum value as follows:

$$BNR_p(k,n) \in [BNR_{min}, BNR_{max}]$$

the BNR may be averaged across the subband bins:

$$BNR_p(n) = \frac{1}{(k_{UB} - k_{LB} + 1)} \sum_{k_{LB}}^{k_{UB}} BNR_p(k, n) \quad (15)$$

the above value may be smoothed recursively to arrive at the mean BNR value:

$$\overline{BNR}_p(n) = \beta \overline{BNR}_p(n-1) + (1-\beta) BNR_p(n) \quad (16)$$

where $\beta$ is a smoothing factor.

The mean BNR value may then be transformed into a scaling factor in the interval of [0,1] using a sigmoid transformation:

$$\xi(n) = 1 - 0.5\left(1 + \frac{\upsilon(n)}{1 + |\upsilon(n)|}\right) \text{ where} \quad (17)$$

$$\upsilon(n) = \gamma(\overline{BNR}_p(n) - \sigma) \quad (18)$$

and $\gamma$ and $\sigma$ are tunable parameters that denote the slope ($\gamma$) and point of inflection ($\sigma$), for the sigmoid function.

Using Equation 17, the adaptation step-size for subband k and frame-index n is obtained as:

$$\mu_p(k, n) = \xi(n)\left(\frac{N_{ZZ,p}(k, n)}{B_{YY}(k, n) + \delta}\right)\mu_o \quad (19)$$

where $\mu_o$ is a nominal step-size. $\mu_o$ may be used as an initial step size with scaling factors and the processes above used to modulate the step size during processing.

At a first time period, audio signals from the microphone array 102 may be processed as described above using a first set of weights for the filters 122. Then, the error E 136 associated with that first time period may be used to calculate a new set of weights for the filters 122, where the new set of weights is determined using the step size calculations described above. The new set of weights may then be used to process audio signals from a microphone array 102 associated with a second time period that occurs after the first time period. Thus, for example, a first filter weight may be applied to a noise reference signal associated with a first audio signal for a first microphone/first direction from the first time period. A new first filter weight may then be calculated using the method above and the new first filter weight may then be applied to a noise reference signal associated with the first audio signal for the first microphone/first direction from the second time period. The same process may be applied to other filter weights and other audio signals from other microphones/directions.

The above processes and calculations may be performed across sub-bands k, across channels p and for audio frames n, as illustrated in the particular calculations and equations.

The estimated non-noise (e.g., output) audio signal E 136 may be processed by a synthesis filterbank 128 which converts the signal 136 into time-domain beamformed audio data Z 150 which may be sent to a downstream component for further operation. As illustrated in FIG. 6, there may be one component audio signal E 136 for each beam, thus for B beams there may be B audio signals E 136. Similarly, there may be one stream of beamformed audio data Z 150 for each beam, thus for B beams there may be B beamformed audio signals B 150. For example, a first beamformed audio signal may correspond to a first beam and to a first direction, a second beamformed audio signal may correspond to a second beam and to a second direction, and so forth.

Figure 7A:
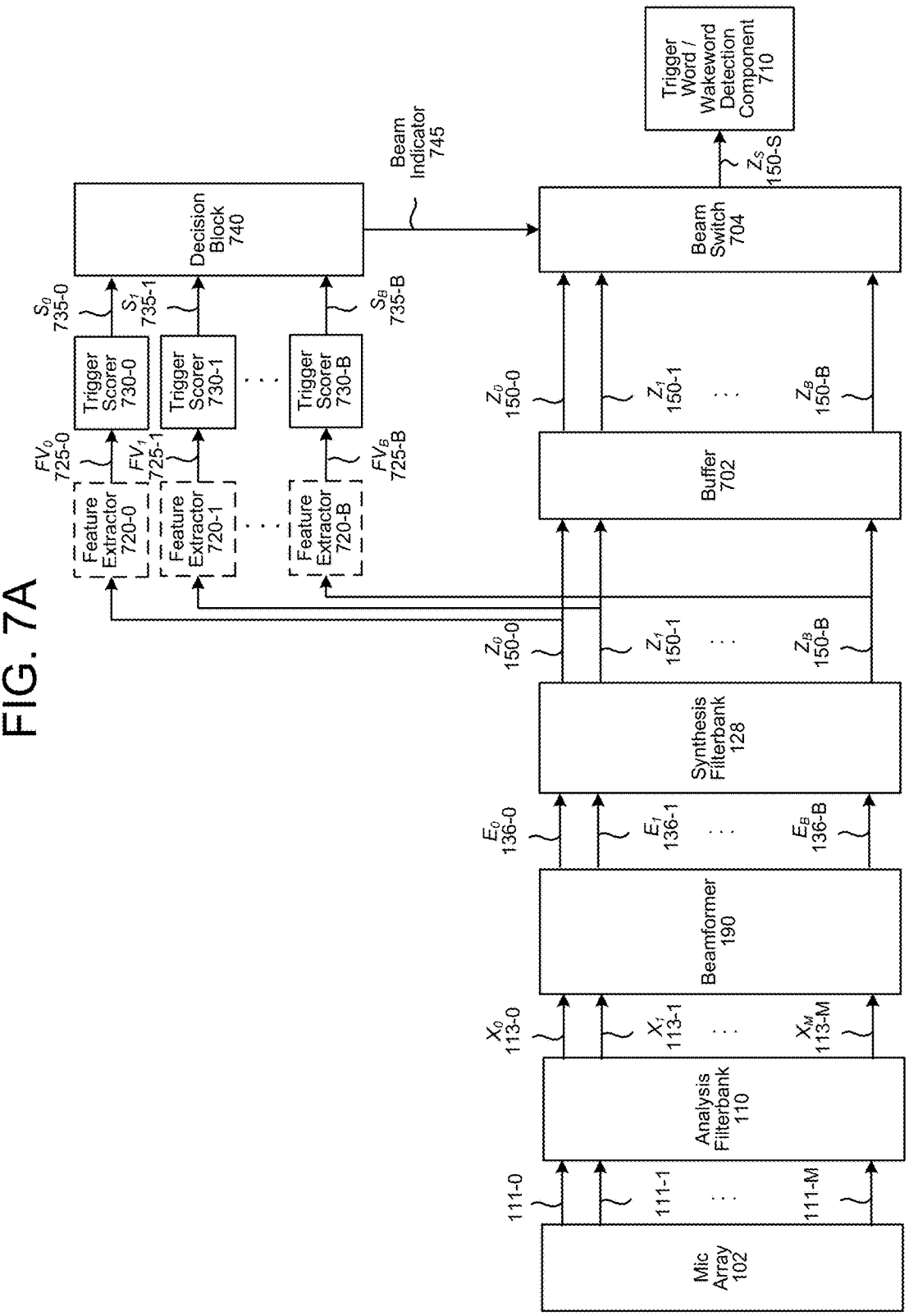
FIG. 7A illustrates components for trigger word-based beam selection according to embodiments of the present disclosure.

As shown in FIG. 7A, the input audio data from a microphone array may include audio data 111 for each microphone 0 through M in the time domain, which may be converted by the analysis filterbank into spectral domain audio signals X 113 for each microphone 0 through M. The beamformer may then convert the audio signals X 113 into beamformer output signals E 136 in the spectral domain, with one signal for each beam 0 through B. The synthesis filterbank may then may convert the signals E 136 into time domain beamformer audio data Z 150, with one set of audio data Z 150 for each beam 0 through B.

The system may then process audio data for each beam individually to determine whether a trigger word or portion thereof is represented in each beam. In particular, each beam may have a feature extractor and a trigger scorer that are used to apply a score to each beam where the score represents a likelihood that a portion of a trigger word is represented in the beam. Each trigger scorer 730 may be configured to operate on time-domain audio data (such as beamformer audio data 150). Alternatively or in addition, each trigger scorer 730 may be configured to operate on spectral domain audio signals such as E 136. Alternatively or in addition, each trigger scorer 730 may be configured to operate on one or more feature vectors (FVs) that represent characteristics of the audio data or signal of a particular beam. Thus, unless specifically indicated otherwise, when the trigger scorer or component thereof (such as a trained model, neural network, etc.) is described as operating on audio data for a beam, it may be any such data corresponding to a beam.

If the trigger scorer 730 is configured to operate on a beam, a feature extractor 720 may operate to create the feature vectors to be processed by the trigger scorer 730. The feature extractor 720 may determine values corresponding to many different features from the beamformed audio data Z 150 and may combine those values into a data structure known as a feature vector. Each feature vector may correspond to one frame worth of audio data, one time window of audio data, or other amount of audio data. Many different features may be determined, as known in the art, and each feature represents some quality of the beamformed audio data 150 that may be useful for purposes of detecting a portion of a trigger word by the trigger scorer 730. A number of approaches may be used by the feature extractor 720 to process the audio data 150, such as mel-frequency cepstral coefficients (MFCCs), perceptual linear predictive (PLP) techniques, neural network feature vector techniques, linear discriminant analysis, semi-tied covariance matrices, or other approaches known to those skilled in the art. In certain embodiments the feature extractor 720 may extract feature vectors FV 725 that include features useful for speech processing. Alternatively, feature vectors extracted by another component (for example an acoustic front end) may be passed to the trigger scorer 730 for trigger word detection.

Referring to FIG. 8, the trigger scorer 730 may include an optional normalizer 852, which transforms each feature vector so that over time, the entries of the feature vectors have zero mean and unit variance. A delay concatenator 854 receives successive feature vectors (e.g., each feature vector being a 20-dimensional real-valued vector) and outputs a delayed concatenation of the feature vectors, in some embodiments formed as the 31 most recent feature vectors (e.g., each concatenated feature vector being a 620-dimensional real-valued vector). Each of these concatenated feature vectors may then be passed through a trained model 856 such as a neural network to produce the output of the trigger scorer 730 as the outputs of the neural network 856. The neural network 856 is configured with configuration data 858, which includes parameters generally referred to as "weights" of the neural network. The configuration data may also include information governing the structure of the network, including the arrangement of nodes and links within a data flow graph representation of the neural network. Embodiments described in this document make use of a particular structure of the neural network 856, in conjunction with corresponding approaches to the determination of the configuration data in a procedure referred to as "parameter estimation" or "training," to provide high accuracy within the computational constraints of the device 100.

The normalized feature vectors are provided to a trigger scorer 730, which may transform the feature vectors 725 to a form that is directly representative of the presence of a trigger word in the original audio signal. For example, in this embodiment, the trigger scorer may determine a sequence of scalar values, referred to below as "score values." In the embodiment shown in FIG. 8, feature vectors (FVs) 725 are provided at a rate of one feature vector every 10 milliseconds (i.e., effectively "sliding" the 25 millisecond window over the signal), and a score value is provided as output at a rate of one score value every 10 milliseconds. In general, a score value produced may depend on not only a current feature vector, but may also depend on a history of feature vectors, for example, on 31 most recent feature vectors (e.g., with the score being delayed by 10 vectors relative to the current feature vector, the 31 vectors include 10 vectors in the "future" relative to the delayed time, and 20 frames in the "past" relative to the delayed time). Thus a sliding window approach may be taken to evaluate a current frame, where the current frame plus some frames prior to that frame and some frames following that frame are considered by the trained model/neural network 856 to output a score S 735 that corresponds to that frame. Thus, for example, for frame 0 the system may analyze feature vectors 725 (or other audio data) for frames −15 through frame 15 and output a score S 735 for frame 0 where the score corresponds to a likelihood that the audio data of frame 0 is part of a trigger word, i.e. at least a portion of a trigger word is represented in frame 0.

The sliding window approach may continue frame by frame. For example, for frame 1 the system may analyze feature vectors 725 (or other audio data) frames −14 through frame 16 and output a score S 735 for frame 1, and so forth. The size of the sliding window is configurable.

Various forms of a trained model 856 in the trigger scorer 730 may be used. One approach uses probability models with estimated parameters, for instance, Gaussian mixture models (GMMs) to perform the transformation from feature vectors to the representations of linguistic content. Another approach is to use an Artificial Neural Network (ANN) to perform this transformation. Within the general use of ANNs, particular types may be used including Recurrent Neural Networks (RNNs), Deep Neural Networks (DNNs), Time Delay Neural Networks (TDNNs), and so forth. Yet other parametric or non-parametric approaches may be used to implement this feature analysis. In an embodiment described more fully below, a variant of a TDNN is used. However, it should be recognized that a DNN, for example, can alternatively be used and may in some implementations provide a preferable tradeoff between computation time, storage requirements and accuracy as compared to the TDNN approach described below.

Before continuing with a description of components of the decision block 740 that may use of the output of the trigger scorer 730, a more detailed description related to the neural network 856 is provided below.

Figure 9:
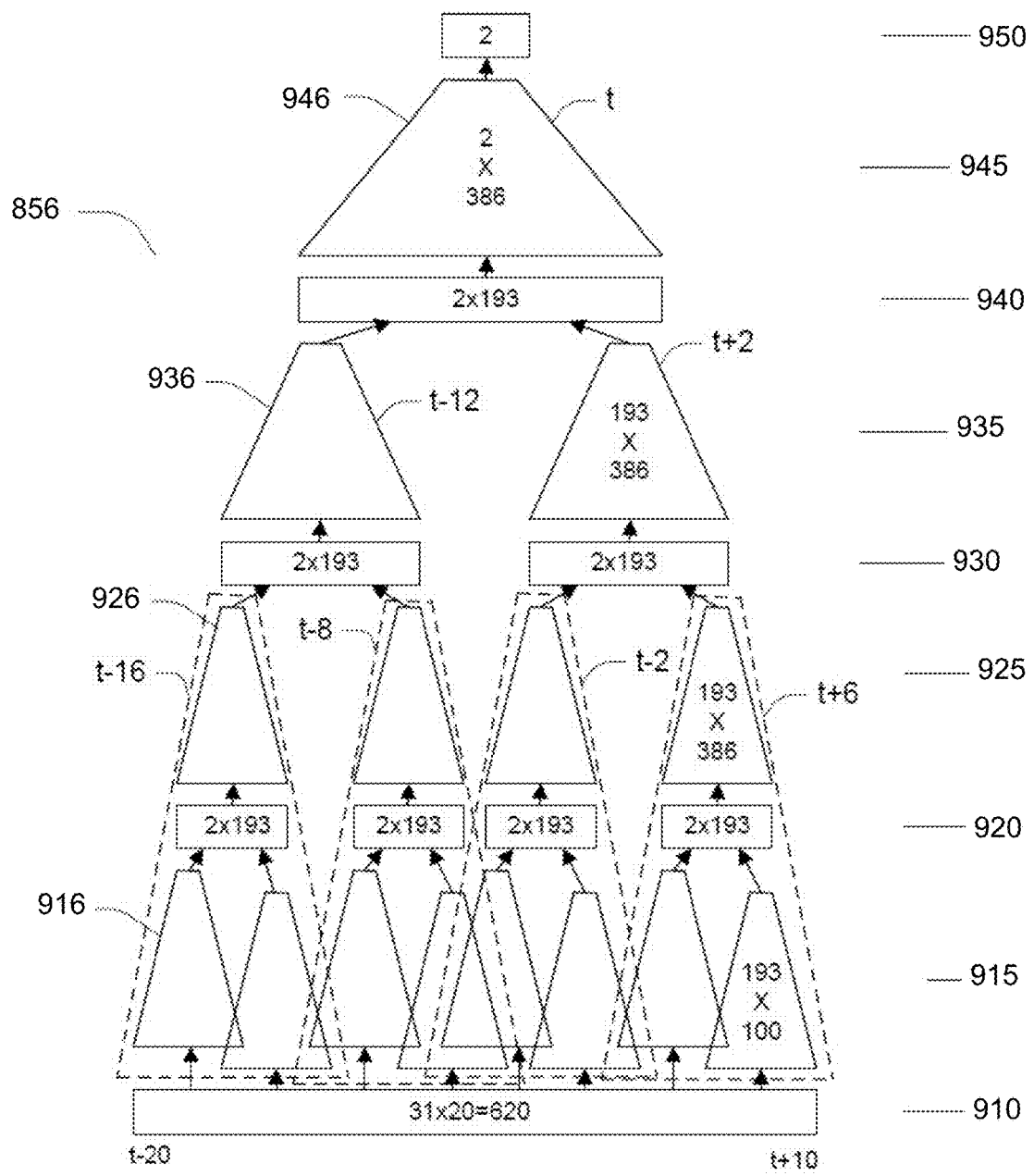
FIG. 9 is a diagram of a time delay neural network (TDNN) of a trigger scorer.

Referring to FIG. 9, the neural network 856 has a multiple layer structure, where inputs are presented at an input layer 910. A concatenation of successive feature vectors forms the input layer. It should be recognized that any concatenation of successive feature vectors corresponds to a time interval of the acoustic signal being processed, with that time interval being the overlap of the time intervals corresponding to each of the individual feature vectors (e.g., the time intervals of the sampled signal used to derive the frequency band energies). In particular, to provide an output of the neural network associated with the $t^{th}$ input frame, 10 frames in the "future", t+1, . . . , t+10, as well as 20 frames in the past, t−20, t−19, . . . , t−1, are used. Because the neural network must wait for the "future" feature vectors, the output is essentially delayed by at least the time associated with 10 frames (e.g., 10 times 10 ms). The output of the first (i.e., input) layer 910 is therefore the 620 entries of the 31 feature vectors. The outputs of the first layer 910 are processed to provide inputs to the second layer 920. As is conventional with such neural networks, each input value to the second layer is formed as a linear weighted combination (i.e., a linear transformation) of the output values of the first layer (generally also including a constant output value). In this example, the second layer has 1,544 units. Therefore, in general, there could be as many as 620×1,544, or almost $1 \times 10^6$ real valued weights defining the linear transformation 915 from the first layer 910 to the second layer 920.

The neural network 856 uses a time-delayed structure, forming what may be referred to as a Time-Delay Neural Network (TDNN), in which groups of input values to the second layer 920 are formed by time delays of application of a same set of weights 916 to successive groups of output values from the first layer. In this embodiment, groups of 100 outputs of the first layer, each group corresponding to 5 consecutive feature vectors of 20 elements each (and corresponding to a time interval of the acoustic signal having an overall duration on which the feature vectors depend), are used to determine 193 inputs to the second layer. In FIG. 9, the weights used to map the first layer's outputs to the second layer's inputs are represented as weights 916 which define the linear transformation 915. In general, as many as 100×193=19,300 real values represent the element 916. These elements applied at 8 time offsets (−18, −14, −10, −6, −4, 0, +4, +8), such that the 5 input frames are centered at these offsets.

The second layer 920 can be considered to be formed of four groups of units, each with 2×193=386 units. These groups each depend on a set of input frames centered at offsets from t of (−16, −8, −2, +6), respectively. For example, the group at offset +6 has two sets of inputs, one set determined from 5 frames centered at +8 (i.e., from +6 to +10) and one set determined from 5 frames centered at +4 (i.e., from +2 to +6). Therefore, the group of units at the second layer at offset +6 depends on 9 input frames at offsets +2 to +10, which are centered at offset +6, illustrated by a grouping in a dashed line labeled t+6. Similarly, the group of units at the second layer corresponding to offset −2 depends on the input frames at offsets −6 to +2, the group correspond to offset −8 on input frames at −12 to −4, and the group corresponding to offset −16 on input frames −20 to −12. The overall mapping from input feature vectors to the sets of 193 inputs at the third later are essentially time delays of each other.

In the second layer 920, each of the 1,544 units implements a fixed non-linearity, in this embodiment a fixed sigmoidal nonlinearity, thereby performing an element-wise non-linear transformation of its inputs to form its outputs. The inputs to the third layer 930 are formed as a linear transformation 925 of the outputs of the second layer 920.

Each group of 986 outputs of a group of units of the second layer is used to determine 193 inputs to the third layer according to a set of weights 926. Each set of weights may be represented by 386×193 real values. As with the mapping from the outputs of the first layer to the inputs of the second layer, the same weights 926 are used for each group of 386 outputs. The units of the third layer 930 can be considered as two groups of 386 units, corresponding to offsets from t of +2 and −12. As with the second layer, each unit of the third layer 930 implements a sigmoidal non-linearity.

Repeating the structure at the second layer, each group of 386 outputs of the third layer 930 maps to a set of 193 inputs to the fourth layer 940 with a set of weights 936 defining a linear transformation 935, and the 386 outputs of the fourth layer 940 map to the outputs of the neural network using a set of weights 946 defining a linear transformation 945. In output layer 950 has a pair of complementary outputs (generally designed to provide an output value and 1 minus that value), and therefore the weights 946 of the linear transformation 945 may be represented by 386×2 real values.

Figure 10:
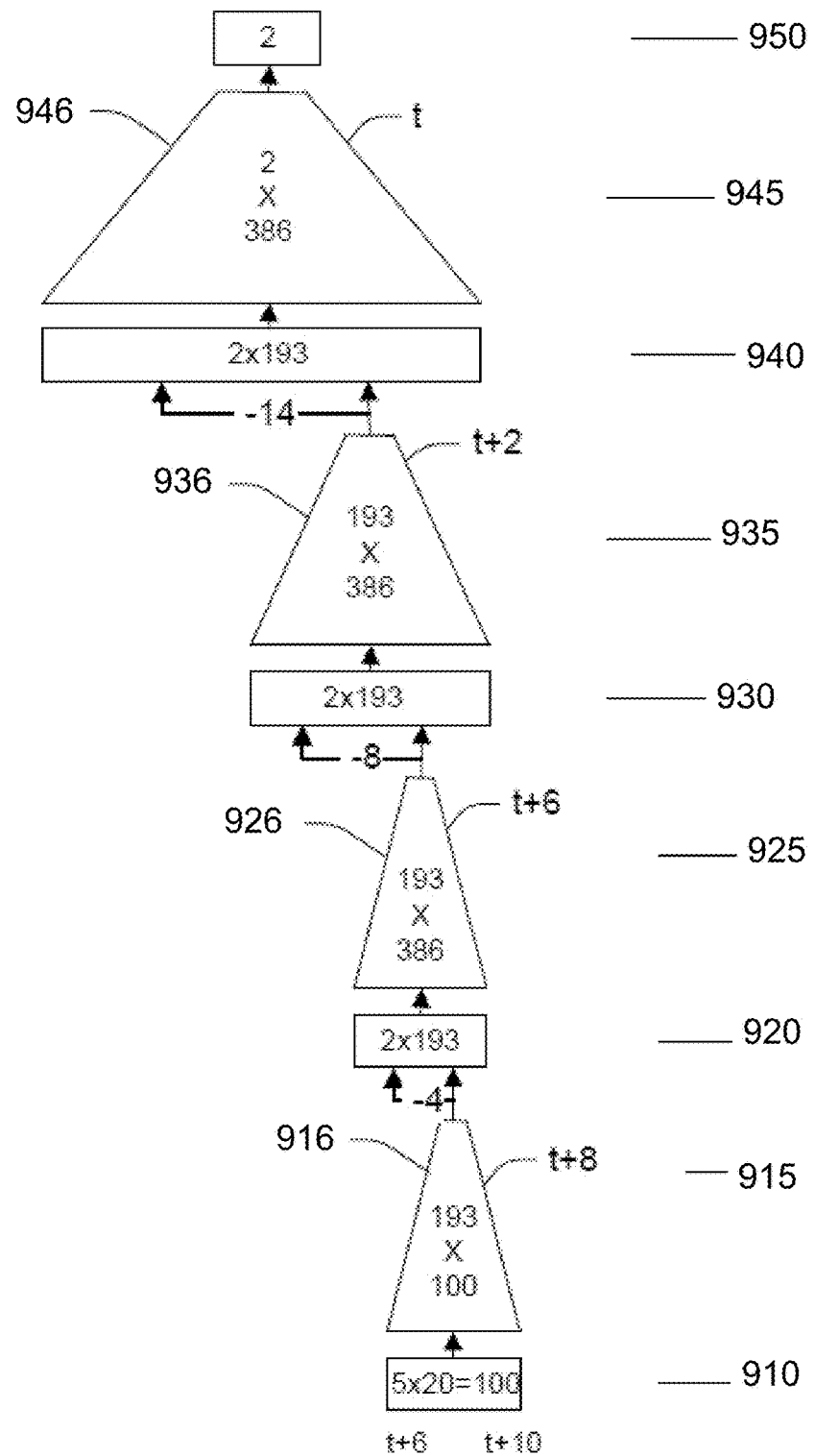
FIG. 10 is a diagram of a run-time implementation of the TDNN of FIG. 9.

Referring to FIG. 10, it may be recognized based on the description above that the neural network 856 may be implemented efficiently by taking advantage of the time delay structure of the network. Because at each time t, the values of the input layer 910 are essentially shifted by one frame (20 values), the required sets of 193 inputs to the second layer previously been computed for all but the first (most recent) set of 5 successive frames (i.e., for offsets t+6 to t+10). Therefore, the two sets of inputs to one group of units of the second layer 920 may be obtained by computing the 193 inputs for the first set of 5 consecutive frames, and using the result of that same computation delayed by 4 frames (i.e., computed using t+2 to t+6). Similarly the inputs for one group of units of the third layer 930 may be computed using the first frames (i.e., from t+2 to t+10) and the result of that computation delayed by 8 frames (i.e., based on input frames t−6 to t+2). Further, one group of inputs at the fourth layer 940 may be computed using the first frames (i.e., t−6 to t+10) and a delay of 14 frames of that computation (i.e., based on frames t−20 to t−4). It should be evident that using this TDNN structure for the neural network 856 greatly reduces the number of arithmetic operations that have to be performed for each input frame as compared to a neural network that does not impose such structure on the weights between the layers of the network.

Figure 11B:
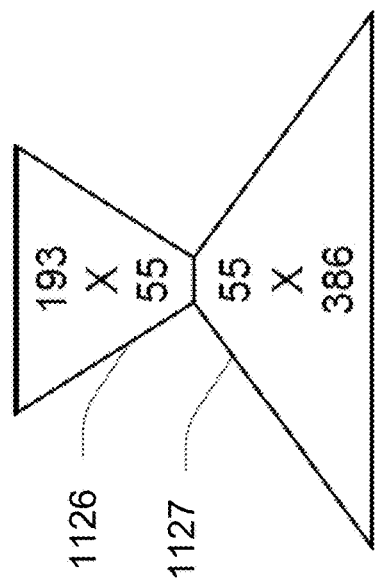
FIGS. 11A and 11B are schematic representations of a fully connected neural network interconnect and a decomposed interconnect, respectively.
Figure 11A:
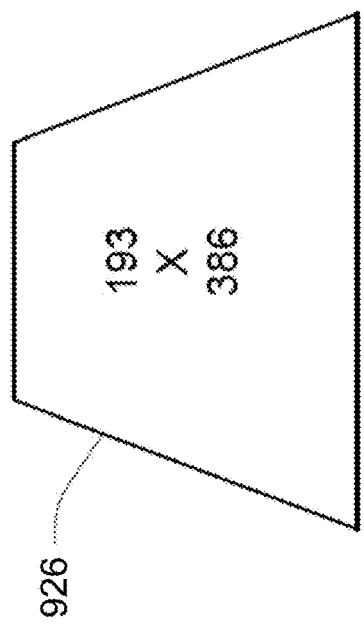

Referring to FIGS. 11A-B, the number of arithmetic operations per frame at runtime for computation of the output of the neural network 856 shown in FIG. 10 is further reduced by imposing a structure on the sets of weights. For example, considering a set of weights 926 that maps 386 outputs from one layer to 193 inputs to the next layer, in general, such a mapping may be represented using 386×193 real valued weights.

Referring to FIG. 11B, to further reduce the number of arithmetic operations required, the mapping from the 386 values to the 193 values is formed as a sequence of two mappings: 386 values to 55 values, followed by 55 values to 193 values. Note that the total number of real values representing this sequence of two mappings is 386×55+55×193=31,845, yielding about half as many arithmetic operations to map the 386 values to the 193 values. Therefore, the procedure for processing the input values (i.e., 386 values) to the transformation represented in FIG. 11B includes computing intermediate values (i.e., 55 values) as a linear transformation of the input values, and then computing the output values (i.e., the 193 values) as another linear transformation of the intermediate values.

For example, with reference to FIG. 10, this procedure is applied to output values at the second layer 920 to determine the result of applying the weights 926 to those values. Recall that because of the time-delay structure shown in FIG. 10, the inputs to the procedure (i.e., the 386 values at layer 920) are formed by application of the weights 916 at the previous layer to input corresponding to frames t+6 to t+10 (and the associated time interval of the acoustic signal) and a time delay (by 4 frames) of application of those weights 916 to input corresponding to frames t+2 to t+6 (corresponding to a prior time interval of the acoustic signal).

Versions of this procedure are performed at each layer 915, 925, 935, and 945 to provide an efficient implementation of the overall transformation illustrated in FIG. 9. It should be recognized that the particular numbers of inputs and outputs and intermediate value, the time delays, the number of layers, and any other parameters specified above are merely examples used in the embodiment that is described in detail, and other values of such parameters may be used in other embodiments.

In the computational structure shown in FIG. 10, each of the groups of weights 916, 926, 936 are represented in a similar decomposition with 55 intermediate values. In the specific example shown in FIG. 10, there are a total of about 87,525 weights, and a similar number of arithmetic operations required for processing each input frame using the neural network.

As shown in FIG. 7A, each beam may be independently processed by a trigger scorer 730. Thus the trained model/ neural network 856 may determine a different score S 735 for each beam, thus outputting B scores S 735 (e.g., $S_0$ 735-0, $S_1$ 735-1 through $S_B$ 735-B) from the respective trigger scorers 730-0 through 730-B to the decision block 740. The trained model/neural network 856 that outputs the score may be similar for each beam, though may be a different instantiation of the trained model/neural network so individual beam scores may be output substantially in parallel.

The individual scores S 735 created by the trained model/ neural network 856, and output by the respective trigger scorers 730 for each beam are passed to the decision block 740 as shown in FIGS. 7 and 8. The scores 735 may correspond to particular frames of audio for their respective beams. For example, for frame 0 the trigger scorer 730-0 may output a score $S_0$ 735-0 indicating whether a portion of the trigger word is detected in the data considered for beam 0 frame 0 (which may be a window of audio data for frames surrounding frame 0 for beam 0. Further, for frame 0 the trigger scorer 730-1 may output a score $S_1$ 735-1 indicating whether a portion of the trigger word is detected in the data considered for beam 1 frame 0 (which may be a window of audio data for frames surrounding frame 0 for beam 1, and so on for beams 0 through B and for the frames of the audio data.

Generally, the decision block 740 implements a timewise smoothing of the scores using a sliding window in a smoother 868 and then compares the output of the smoother in a threshold detector 869 to determine when the smoothed score value exceeds a pre-defined threshold. The parameters for configuring the smoother 868 and the threshold of the threshold detector 869 are stored in the detector configuration data 867.

Figure 12:
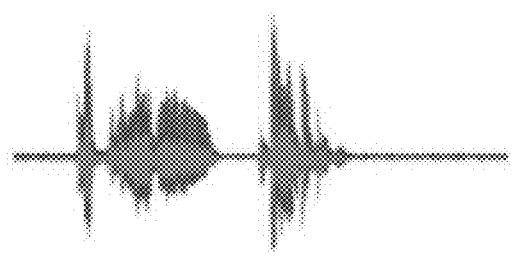
FIG. 12 is a graph of a sample waveform.
Figure 13A:
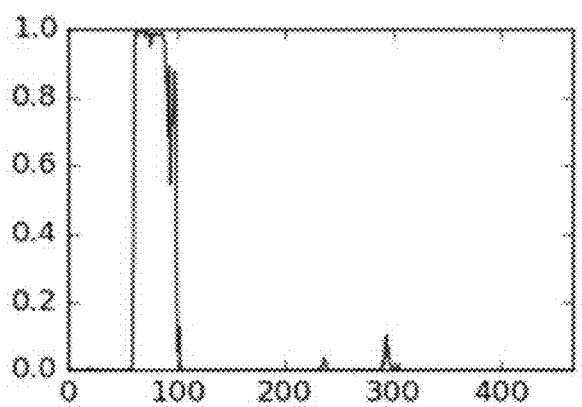
FIGS. 13A-C illustrate a score value, a smoothed score value, and a decision block output, respectively, corresponding to the waveform of FIG. 12.
Figure 13B:
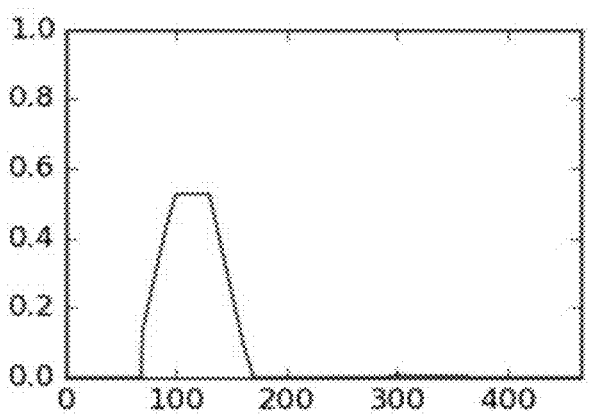
Figure 13C:
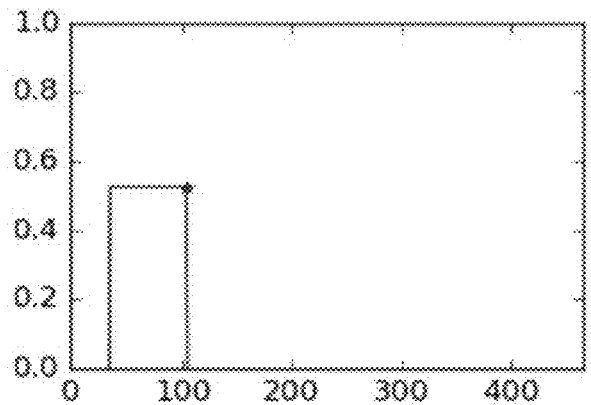

Referring to FIG. 12, an example an input speech utterance is shown as the waveform of the signal acquired by the microphone. An initial period of energy in the waveform corresponds to a user speaking the wakeword "Alexa." FIGS. 13A-C show the corresponding time aligned time evolution of (A) the score value output from the trigger scorer, (B) the smoothed score value output from the smoother 868, and (C) the thresholded value output from the threshold detector 869. In this example, it can be observed that for the wakeword "Alexa" at the beginning (FIG. 12), the score value correctly outputs high values (i.e., close to 1.0) for the input corresponding to the utterance of "Alexa." The smoother 868 smoothes (i.e., averages) the score values with a rectangular sliding windows. Finally, the threshold detector 869 triggers when the smoothed value reaches a local maximum over a predefined threshold, and outputs a rectangular window that preceded that point by the equivalent of 750 ms (i.e., 75 input feature vectors at a rate to 10 ms per input).

The decision block 740 may also choose from among the available beams which beam best represents the trigger word, and thus which beam's data should be sent for further processing. As shown in FIG. 8, the decision block 740 may include a discrete beam selector 872, that may compare the input scores and may select the beam with the highest score over a time period. That is, the decision block may collect the frame scores for all beams over a certain time period and may select the beam that has the highest score corresponding to the presence of a trigger word portion. That highest score may be the highest score for a single frame from the time period, or may be a highest aggregate score across beams for the time period. The time period in question may vary from a single frame (making the decision on beam selection of the decision block 740 relatively fast) to a configurable length of time (e.g., a certain number of frames, a certain number of milliseconds, etc.). The decision block 740 may use the threshold detector 869 in concert with the discrete beam selector 872 so that only scores above a certain threshold are considered by the discrete beam selector 872 when selecting which beam most strongly represents the trigger word.

The discrete beam selector 872, and in particular the threshold detector 869, may continue to process score data (either as output by the trigger scorers 730 or smoothed by the smoother 868) to determine when a score crosses a threshold. For smoothed score data, the threshold detector 869 may detect when a maxima of a smoothed score (e.g., the highest score of the smoothed score data) crosses the threshold. Once a score passes the threshold, the discrete beam selector may note the time of the audio data corresponding to the above-threshold score, thus noting when the trigger word was originally detected. The discrete beam selector may then wait a pre-configured time period (for example, 100 ms) and analyze the score data during that time period. The discrete beam selector 872 may then note which beam corresponded to the highest score value during the time period, and may then select that beam as the beam to indicate in beam indicator 745.

The decision block 740 may also include a continuous beam selector 870, that may also select a beam based on a time period's worth of data. The continuous beam selector 870 may monitor scores for beams over a certain configurable time period and may note which beam is the first to have a score that crosses a threshold (as determined by the threshold detector 869). That beam may be considered by the continuous beam selector 870 to be the beam that corresponds to a direction of a speaker who spoke the trigger word (hence that beam being the first to detect the portion of the trigger word). Thus the continuous beam selector 870 may select that beam and the decision block 740 may indicate that beam in the beam indicator 745. Thus, if data for a first beam indicates that a trigger word portion was detected in the first beam at a first frame, and data for a second beam indicates that a trigger word portion was detected in the second beam at a second frame after the first frame, the continuous beam selector 870 may select the first beam.

Once the decision block 740 has determined which beam most strongly represents the trigger word (or portion thereof) it outputs a beam indicator 745 corresponding to that beam.

The decision block 740 may continue to operate during processing of audio data related to a single utterance, such that the selected beam may change during processing of the single utterance. In such a situation, the decision block 740 may change the beam indicated in the beam indicator 745 and the beam switch 704 may smooth and switch beams as indicated below. Such ongoing beam analysis may assist in processing an utterance for a user that is moving with respect to device 100 and is thus switching beams mid-utterance. If it is determined that a user is not moving, the decision block 740 may remain with the same beam throughout the utterance.

In certain instances, the decision block 740 may not necessarily select the best beam using the techniques above to avoid too rapid or too frequent switching of beams. In one example, if the decision block 740 determines that the beam that best represents the trigger word is not the beam that is currently selected by the beam indicator 745/beam switch 704, the decision block 740 may compare a score for the best beam and a score for the beam that is currently selected. Only if a difference between those two scores exceeds a threshold will the decision block 740 switch the selected beam. Such a threshold is configurable and may allow the decision block 740 to operate using hysteresis or other techniques to avoid rapidly switching back and forth between beams. The threshold value may be tuned using a large data set to determine one or more thresholds that result in desired system operation. Thus the decision block 740 may avoid too frequent switching between beams.

Returning to FIG. 7A, The trigger scorer 730 and decision block 740 described above are an example of components that enable a device to provide an improved trigger detection error rate within a limited computation capacity (e.g., limits on power, limits on the number of operations per second and/or the size of memory available to continuously process monitored audio) of the device 100. Thus, using the relatively low power trigger scorer 730 (relative to the wakeword detection component 710), the device 100 may use relatively small amount of computing resources to more accurately select a beam that focuses on the direction of a speech source (e.g., a user who spoke the wakeword).

Once the decision block 740 determines that a beam includes a best representation of a trigger word portion (which may include the entire trigger word) it may send a beam indicator 745 (which may simply be the number of the beam that includes the trigger word, e.g., "7") to the beam switch 704. The beam switch 704 inputs the beamformed audio data corresponding to each beam (after being held by a buffer 702 to account for any time delays of processing by the feature extractor 720, trigger scorer 730, and decision block 740) and the beam indicator 745. The beam switch 704 then sends the audio data for the particular selected beam S, Zs 150-S to a downstream component. When the decision block changes a selected beam, the beam switch 704 may also perform some smoothing operations to avoid any jumps in audio data that may create audio artifacts detectable by a user.

As shown in FIG. 7A, the selected beam's audio data Zs 150-S may be sent to a trigger word/wakeword detection component 710. The detection component 710 may be a traditional trigger word/wakeword detection component that uses more computing resources (e.g., more power) than the trigger scorers 730. Further, the detection component 710 may not process audio data frame-by-frame, but rather may wait until a certain amount of audio data has been received so the component 710 may match the audio data that it receives to a stored audio signature corresponding to a trigger word.

Thus, when a beam's audio data is selected by the beam switch 704, the device 100 may use the detection component 710 to perform confirmatory trigger word/wakeword detection to make sure a user intends to speak a command to the device 100. This process may also be referred to as trigger word detection, with the wakeword being a specific example of a trigger word. Specifically, trigger word detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the detection component 710 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for trigger word/wakeword detection, such as those known in the art, may also be used.

If the trigger word/wakeword detection component 710 does confirm the detection of a wakeword, the device 100 may send the selected beam's audio data Zs 150-S to a speech processing component (such as a remote device configured to perform speech processing). The audio data Zs 150-S may include both the audio data already determined for the beam as well as further audio data that followed the wakeword in the beam. The sending may occur using a compressed form of audio data Zs 150-S. Other downstream operations may also be performed on the selected beam's data if the presence of the trigger word is confirmed by the detection component 710.

Figure 7B:
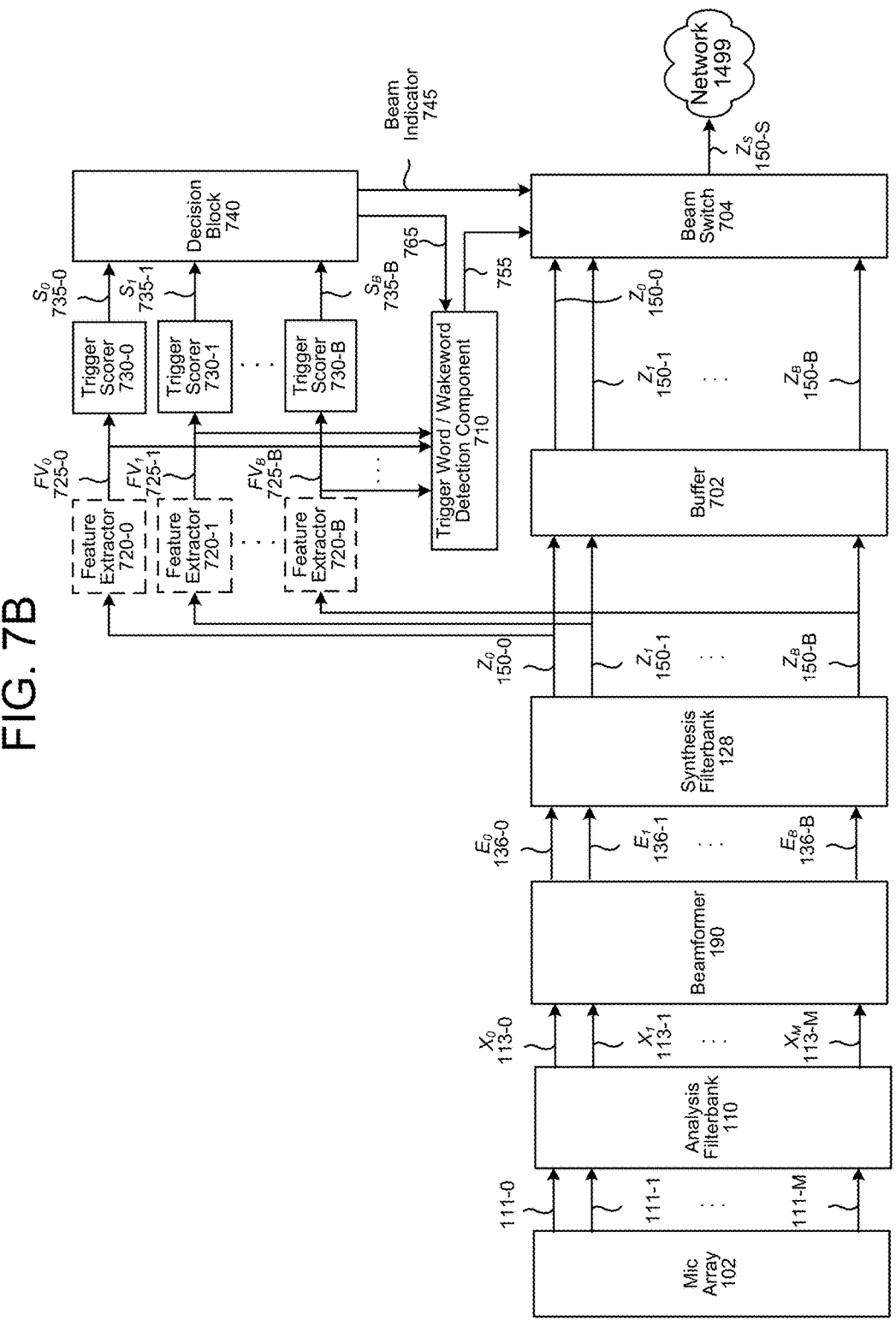
FIG. 7B illustrates components for trigger word-based beam selection according to embodiments of the present disclosure.
Figure 7C:
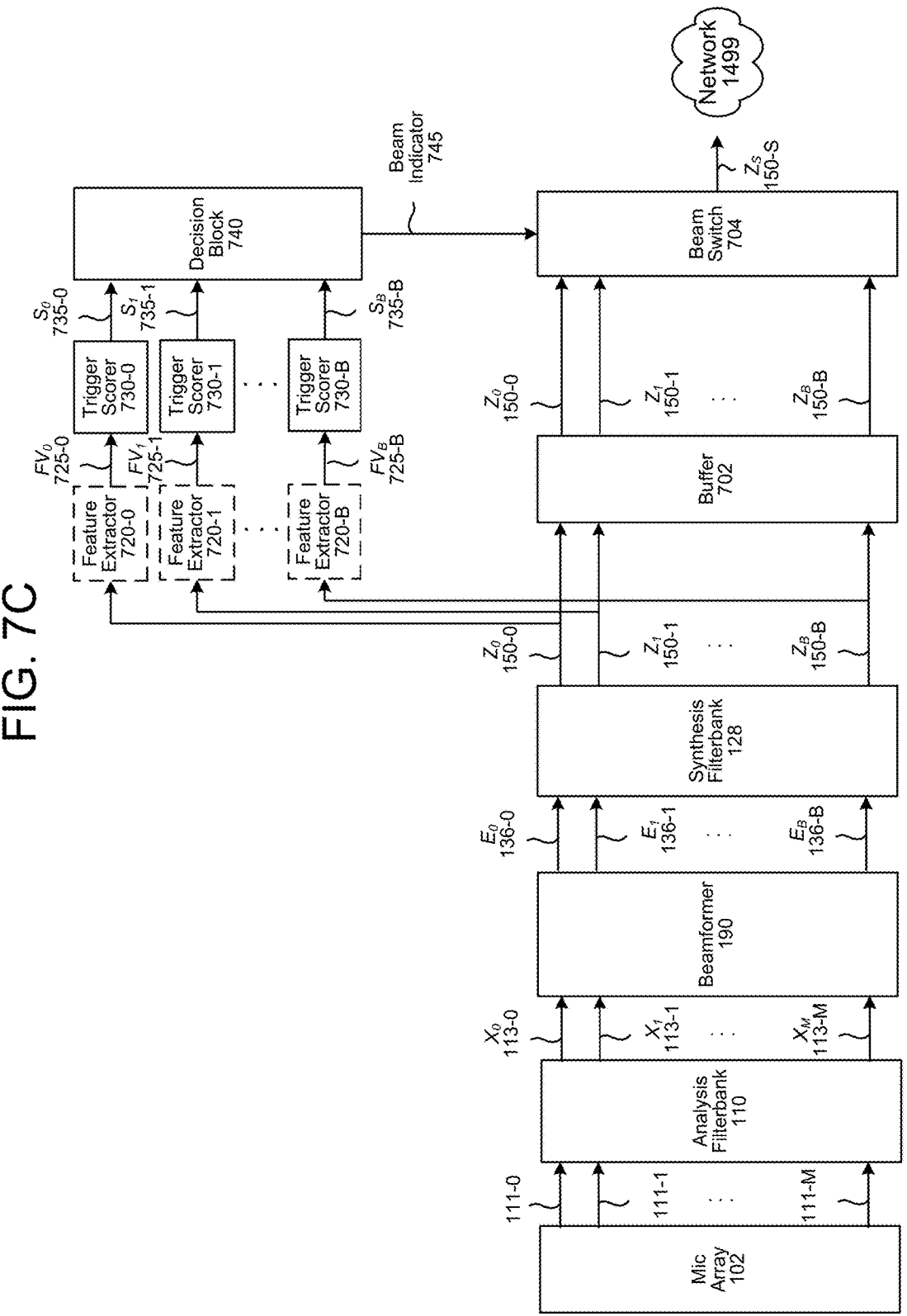
FIG. 7C illustrates components for beam-based trigger word detection according to embodiments of the present disclosure.

In certain embodiments, such as that shown in FIG. 7B, the decision component 710 may be configured to operate on similar features as the trigger scorers 730. That is, any feature vectors 725 created by feature extractors 720 may also be sent to the decision block 710 in order to reduce latency and increase the speed at which the device 100 may confirm the presence of a trigger word. Thus, upon the decision block 740 determining that a trigger word was detected using the scores 735, the decision block 740 may send an indication 765 (which may include a beam indicator 745, score 735, or other information) to the wakeword detection component 710. The wakeword detection component 710 may then operate on the feature vectors 725 (which may include a group of accumulated feature vectors) corresponding to the selected beam to confirm that a wakeword is represented in the selected beam. The wakeword detection component 710 may then output an indication 755 to the beam switch 704 to send the audio data $Z_s$ 150-S for the selected beam indicated in 745 (which may include both audio data already determined for the beam as well as further audio data that followed the wakeword in the beam) to the appropriate downstream component, which may be over the network 1499, for example to a remote device for speech processing.

In certain embodiments, the device 100 may not implement the detection component 710 and may instead rely on the beam selection done by decision block 740. In such a configuration, such as that shown in FIG. 7C, the beam indicator 745 may indicate to the beam switch 704 to send the audio data $Z_s$ 150-S for the selected beam indicated in 745 (which may include both audio data already determined for the beam as well as further audio data that followed the wakeword in the beam) to the appropriate downstream component, which may be over the network 1499, for example to a remote device for speech processing.

Various machine learning techniques may be used to perform the training of the trigger scorer 730, trained model/neural network 856 or other components. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. Focusing on CRF as an example, CRF is a class of statistical models used for structured predictions. In particular, CRFs are a type of discriminative undirected probabilistic graphical models. A CRF can predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

Figure 14:
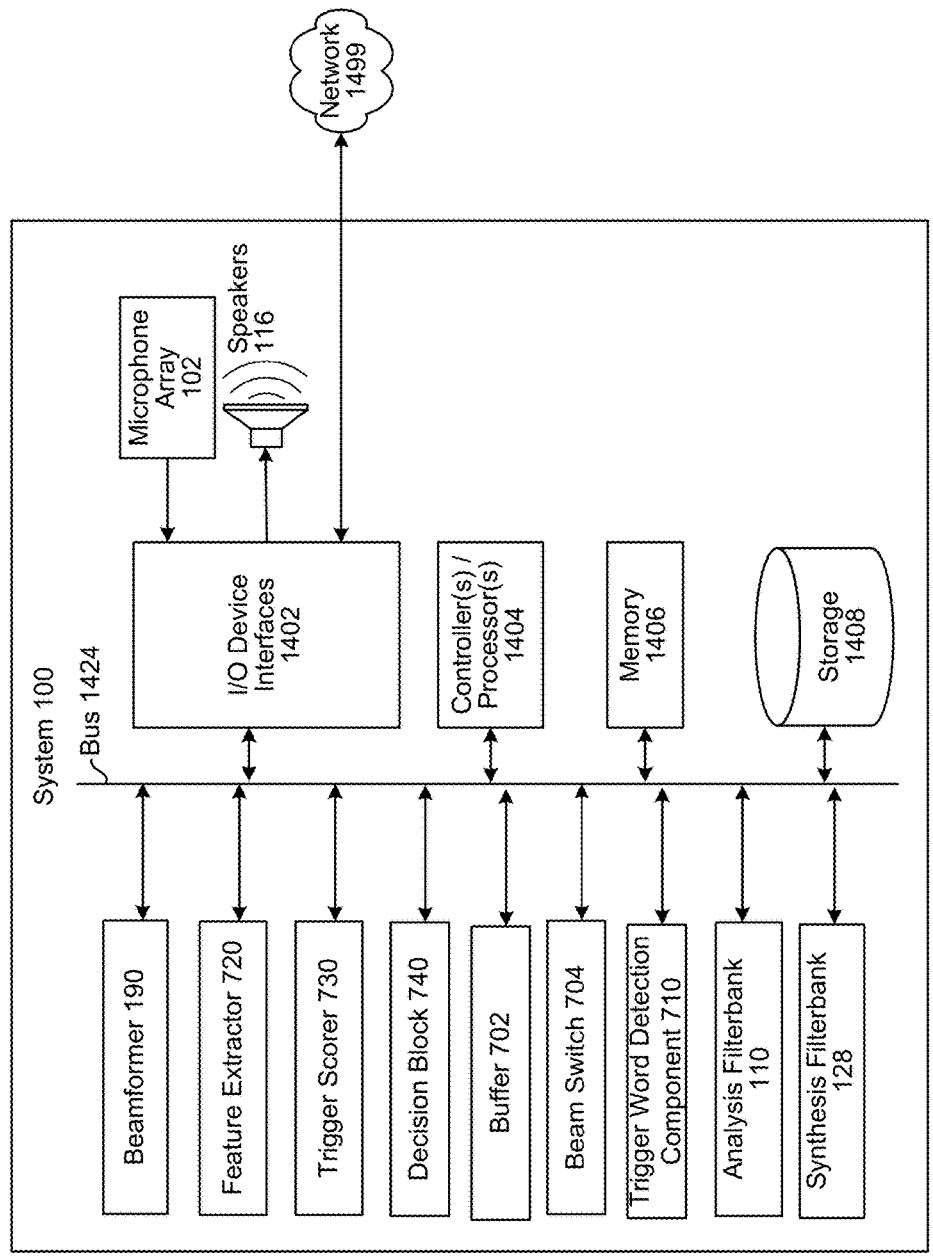
FIG. 14 is a block diagram conceptually illustrating example components of a device according to embodiments of the present disclosure.

FIG. 14 is a block diagram conceptually illustrating example components of the device 100. In operation, the device 100 may include computer-readable and computer-executable instructions that reside on the device, as will be discussed further below.

The device 100 may include one or more audio capture device(s), such as a microphone array 102 which may include a plurality of microphones 202. The audio capture device(s) may be integrated into a single device or may be separate.

The device 100 may also include an audio output device for producing sound, such as speaker(s) 116. The audio output device may be integrated into a single device or may be separate.

The device 100 may include an address/data bus 1424 for conveying data among components of the device 100. Each component within the device may also be directly connected to other components in addition to (or instead of) being connected to other components across the bus 1424.

The device 100 may include one or more controllers/processors 1404, that may each include a central processing unit (CPU) for processing data and computer-readable instructions, and a memory 1406 for storing data and instructions. The memory 1406 may include volatile random access memory (RAM), non-volatile read only memory (ROM), non-volatile magnetoresistive (MRAM) and/or other types of memory. The device 100 may also include a data storage component 1408, for storing data and controller/processor-executable instructions (e.g., instructions to perform operations discussed herein). The data storage component 1408 may include one or more non-volatile storage types such as magnetic storage, optical storage, solid-state storage, etc. The device 100 may also be connected to removable or external non-volatile memory and/or storage (such as a removable memory card, memory key drive, networked storage, etc.) through the input/output device interfaces 1402.

Computer instructions for operating the device 100 and its various components may be executed by the controller(s)/processor(s) 1404, using the memory 1406 as temporary "working" storage at runtime. The computer instructions may be stored in a non-transitory manner in non-volatile memory 1406, storage 1408, or an external device. Alternatively, some or all of the executable instructions may be embedded in hardware or firmware in addition to or instead of software.

The device 100 may include input/output device interfaces 1402. A variety of components may be connected through the input/output device interfaces 1402, such as the speaker(s) 116, the microphone array 120, and a media source such as a digital media player (not illustrated). The input/output interfaces 1402 may include A/D converters (not shown) and/or D/A converters (not shown).

The device may include one or more of the various components discussed herein including, but not limited to, a beamformer 190, feature extractors 720, trigger scorers 730, decision block 740, buffer 702, beam switch 704, trigger word detection component 710, analysis filterbank 110, synthesis filterbank 128, and/or other components for performing the processes discussed above.

The input/output device interfaces 1402 may also include an interface for an external peripheral device connection such as universal serial bus (USB), FireWire, Thunderbolt or other connection protocol. The input/output device interfaces 1402 may also include a connection to one or more networks 1499 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1499, the device 100 may be distributed across a networked environment.

Multiple devices may be employed in a single device 100. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system. For example, certain components such as an FBF (including filter and sum component 130), adaptive beamformer (ABF) 160, may be arranged as illustrated or may be arranged in a different manner, or removed entirely and/or joined with other non-illustrated components.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the adaptive beamformer 160, beamformer 190, etc. may be implemented by a digital signal processor (DSP).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving input audio data corresponding to input audio captured by a microphone array;
performing beamforming on the input audio data to determine first beamformed audio data corresponding to a first direction and second beamformed audio data corresponding to a second direction;
processing the first beamformed audio data to determine a first plurality of feature vectors corresponding to a first time period;
processing the first plurality of feature vectors using a first neural network to determine a first score, the first score corresponding to a likelihood that at least a first portion of a wakeword is represented in the first beamformed audio data corresponding to first time period;
processing the second beamformed audio data to determine a second plurality of feature vectors corresponding to a second time period;
processing the second plurality of feature vectors using a second neural network to determine a second score, the second score corresponding to a likelihood that at least a second portion of the wakeword is represented in the second beamformed audio data corresponding to the second time period;
determining, based on the first score exceeding a threshold, that the first portion of the wakeword is represented in the first beamformed audio data;
determining, based on the second score exceeding the threshold, that the second portion of the wakeword is represented in the second beamformed audio data;
determining that the first portion of the wakeword represented in the first beamformed audio data corresponds to the first time period;
determining that the second portion of the wakeword represented in the second beamformed audio data corresponds to the second time period;
selecting the first beamformed audio data in response to the first time period being prior to the second time period; and sending the first beamformed audio data for further processing.

2. The computer-implemented method of claim 1, further comprising:
sending the first beamformed audio data to a wakeword component;
operating the wakeword component to compare the first beamformed audio data to a stored audio signature corresponding to the wakeword;
determining, using the wakeword component, that the first beamformed audio data comprises the wakeword; and
sending the first beamformed audio data to a remote device for speech processing.

3. A computer-implemented method comprising:
receiving input audio data corresponding to input audio captured by a microphone array;
performing beamforming on the input audio data to determine first beamformed audio data corresponding to a first direction and second beamformed audio data corresponding to a second direction;
determining at least one first feature vector corresponding to a first portion of the first beamformed audio data and at least one second feature vector corresponding to a first portion of the second beamformed audio data;
using a first trained model to process the at least one first feature vector to determine a first score, the first score corresponding to a likelihood that at least a first portion of a wakeword is represented in the first portion of the first beamformed audio data;
using a second trained model to process the at least one second feature vector to determine a second score, the second score corresponding to a likelihood that at least a second portion of the wakeword is represented in the first portion of the second beamformed audio data;
determining, based on at least the first score exceeding a threshold, that at least the first portion of the wakeword is represented in the first portion of the first beamformed audio data;
determining, based on at least the second score exceeding the threshold, that at least the second portion of the wakeword is represented in the first portion of the second beamformed audio data; and
selecting, based at least on the first score and the second score, at least a second portion of the first beamformed audio data for further processing by a speech processing component configured to identify a command to perform an action.

4. The computer-implemented method of claim 3, further comprising:
determining that at least the first portion of the wakeword represented in the first portion of the first beamformed audio data corresponds to a first time period;
determining a plurality of scores, including the second score, wherein each of the plurality of scores corresponds to audio data captured within a time window after the first time period; and
determining the first score is greater than each of the plurality of scores.

5. The computer-implemented method of claim 3, wherein:
the first portion of the first beamformed audio data corresponds to a first time period;
the first portion of the second beamformed audio data corresponds to the first time period; and
the method further comprises determining that the first score is greater than the second score.

6. The computer-implemented method of claim 3, wherein the first portion of the first beamformed audio data and the first portion of the second beamformed audio data correspond to a first time period and the method further comprises:
determining a third portion of the first beamformed audio data and a second portion of the second beamformed audio data, wherein the third portion of the first beamformed audio data and the second portion of the second beamformed audio data correspond to a second time period after the first time period;
using the first trained model to process the third portion of the first beamformed audio data to determine a third score;
using the second trained model to process the second portion of the second beamformed audio data to determine a fourth score;
determining that the fourth score is greater than the third score;
determining a difference between the fourth score and the third score;
determining that the difference does not exceed a threshold; and
selecting, based at least in part on the difference not exceeding the threshold, at least a fourth portion of the first beamformed audio data for further processing.

7. A computer-implemented method, comprising:
receiving input audio data corresponding to input audio captured by a microphone array;
determining first audio data corresponding to a first direction and second audio data corresponding to a second direction;
using a first trained model to process the first audio data to determine a first score, the first score corresponding to a likelihood that at least a first portion of a wakeword is represented in the first audio data;
using a second trained model to process the second audio data to determine a second score, the second score corresponding to a likelihood that at least a second portion of the wakeword is represented in the second audio data;
determining, based on at least the first score exceeding a threshold, that at least the first portion of the wakeword is represented in the first audio data;
determining, based on at least the second score exceeding the threshold, that at least the second portion of the wakeword is represented in the second audio data;
determining that at least the first portion of the wakeword represented in the first audio data corresponds to a first time period;
determining that at least the second portion of the wakeword represented in the second audio data corresponds to a second time period; and
selecting, based at least in part on the first score, the second score, and the first time period being before the second time period, further audio data corresponding to the first direction for further processing.

8. The computer-implemented method of claim 3, further comprising:
sending at least the first portion of the first beamformed audio data to a further wakeword detection component; and
by the further wakeword detection component, comparing the first portion of the first beamformed audio data to a stored audio signature corresponding to the wakeword to determine that the first portion of the first beamformed audio data represents the wakeword.

9. The computer-implemented method of claim 8, wherein comparing the first portion of the first beamformed audio data to the stored audio signature with the further wakeword detection component uses more computing power than using the first trained model to process the at least one first feature vector to determine the first score.

10. The computer-implemented method of claim 3, further comprising:
sending the at least one first feature vector to a further wakeword detection component.

11. The computer-implemented method of claim 3, further comprising:
sending the second portion of the first beamformed audio data to the speech processing component.

12. A device comprising:
at least one processor;
at least one microphone array comprising a plurality of microphones; and
at least one memory including instructions operable to be executed by the at least one processor to configure the device to:
receive input audio data corresponding to input audio captured by the at least one microphone array,
perform beamforming on the input audio data to determine first beamformed audio data corresponding to a first direction and second beamformed audio data corresponding to a second direction,
determine at least one first feature vector corresponding to a first portion of the first beamformed audio data and at least one second feature vector corresponding to a first portion of the second beamformed audio data,
use a first trained model to process the at least one first feature vector to determine a first score, the first score corresponding to a likelihood that at least a first portion of a wakeword is represented in the first portion of the first beamformed audio data,
use a second trained model to process the at least one second feature vector to determine a second score, the second score corresponding to a likelihood that at least a second portion of the wakeword is represented in the first portion of the second beamformed audio data,
determine, based on at least the first score exceeding a threshold, that at least the first portion of the wakeword is represented in the first portion of the first beamformed audio data,
determine, based on at least the second score exceeding the threshold, that at least the second portion of the wakeword is represented in the first portion of the second beamformed audio data, and
select, based at least on the first score and the second score, at least a second portion of the first beamformed audio data for further processing by a speech processing component configured to identify a command to perform an action.

13. The device of claim 12, wherein the memory includes additional instructions operable to be executed by the at least one processor to further configure the device to:
determine that at least the first portion of the wakeword represented in the first portion of the first beamformed audio data corresponds to a first time period;
determine a plurality of scores, including the second score, wherein each of the plurality of scores corresponds to audio data captured within a time window after the first time period; and
determine the first score is greater than each of the plurality of scores.

14. The device of claim 12, wherein:
the first portion of the first beamformed audio data corresponds to a first time period;
the first portion of the second beamformed audio data corresponds to the first time period; and
the memory includes additional instructions operable to be executed by the at least one processor to further configure the device to determine that the first score is greater than the second score.

15. The device of claim 12, wherein the first portion of the first beamformed audio data and the first portion of the second beamformed audio data correspond to a first time period and the memory includes additional instructions operable to be executed by the at least one processor to further configure the device to:
determine a third portion of the first beamformed audio data and a second portion of the second beamformed audio data, wherein the third portion of the first beamformed audio data and the second portion of the second beamformed audio data correspond to a second time period after the first time period;
use the first trained model to process the third portion of the first beamformed audio data to determine a third score;
use the second trained model to process the second portion of the second beamformed audio data to determine a fourth score;
determine that the fourth score is greater than the third score;
determine a difference between the fourth score and the third score;
determine that the difference does not exceed a threshold; and
select, based at least in part on the difference not exceeding the threshold, at least a fourth portion of the first beamformed audio data for further processing.

16. A device, comprising:
at least one processor;
at least one microphone array comprising a plurality of microphones; and
at least one memory including instructions operable to be executed by the at least one processor to configure the device to:
receive input audio data corresponding to input audio captured by the at least one microphone array,
determine first audio data corresponding to a first direction and second audio data corresponding to a second direction,
use a first trained model to process the first audio data to determine a first score, the first score corresponding to a likelihood that at least a first portion of a wakeword is represented in the first audio data,
use a second trained model to process the second audio data to determine a second score, the second score corresponding to a likelihood that at least a second portion of the wakeword is represented in the second audio data,
determine, based on at least the first score exceeding a threshold, that at least the first portion of the wakeword is represented in the first audio data,
determine, based on at least the second score exceeding the threshold, that at least the second portion of the wakeword is represented in the second audio data, determine that at least the first portion of the wakeword represented in the first audio data corresponds to a first time period;

determine that at least the second portion of the wakeword represented in the second audio data corresponds to a second time period, and select, based at least in part on the first score, the second score, and the first time period being before the second time period, further audio data corresponding to the first direction for further processing.

17. The device of claim 12, wherein the memory includes additional instructions operable to be executed by the at least one processor to further configure the device to:

send at least the first portion of the first beamformed audio data to a further wakeword detection component; and by the further wakeword detection component, compare the first portion of the first beamformed audio data to a stored audio signature corresponding to the wakeword to determine that the first portion of the first beamformed audio data represents the wakeword.

18. The device of claim 17, wherein execution of the additional instructions to compare the first portion of the first beamformed audio data to the stored audio signature with the further wakeword detection component uses more computing power than execution of the instructions to use the first trained model to process the at least one first feature vector to determine the first score.

19. The device of claim 12, wherein the memory includes additional instructions operable to be executed by the at least one processor to further configure the device to:

send the at least one first feature vector to a further wakeword detection component.

20. The device of claim 12, wherein the memory includes additional instructions operable to be executed by the at least one processor to further configure the device to:

send the second portion of the first beamformed audio data to the speech processing component.

* * * * *